Oct. 3, 1933.          H. A. BURT          1,928,716
TYPOGRAPHICAL COMPOSING AND DISTRIBUTING MACHINE
Filed Nov. 10, 1931          15 Sheets-Sheet 1

INVENTOR
H. A. Burt
BY
ATTORNEYS

Oct. 3, 1933.   H. A. BURT   1,928,716
TYPOGRAPHICAL COMPOSING AND DISTRIBUTING MACHINE
Filed Nov. 10, 1931   15 Sheets-Sheet 2
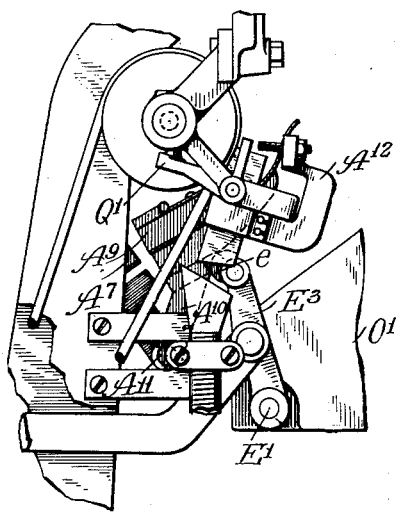
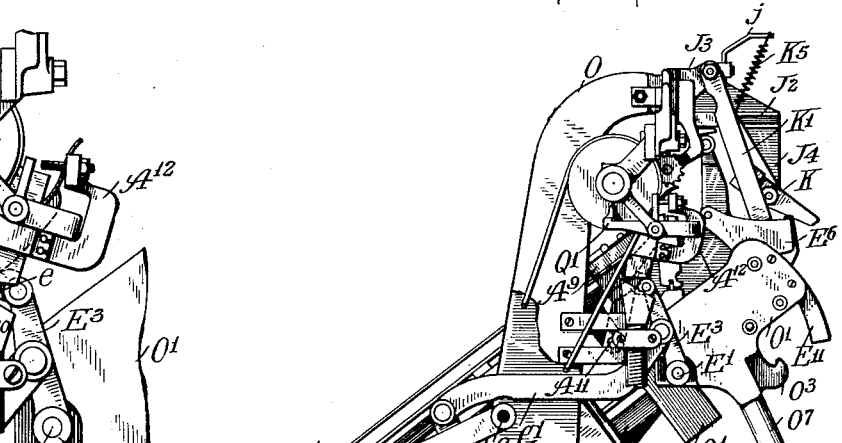
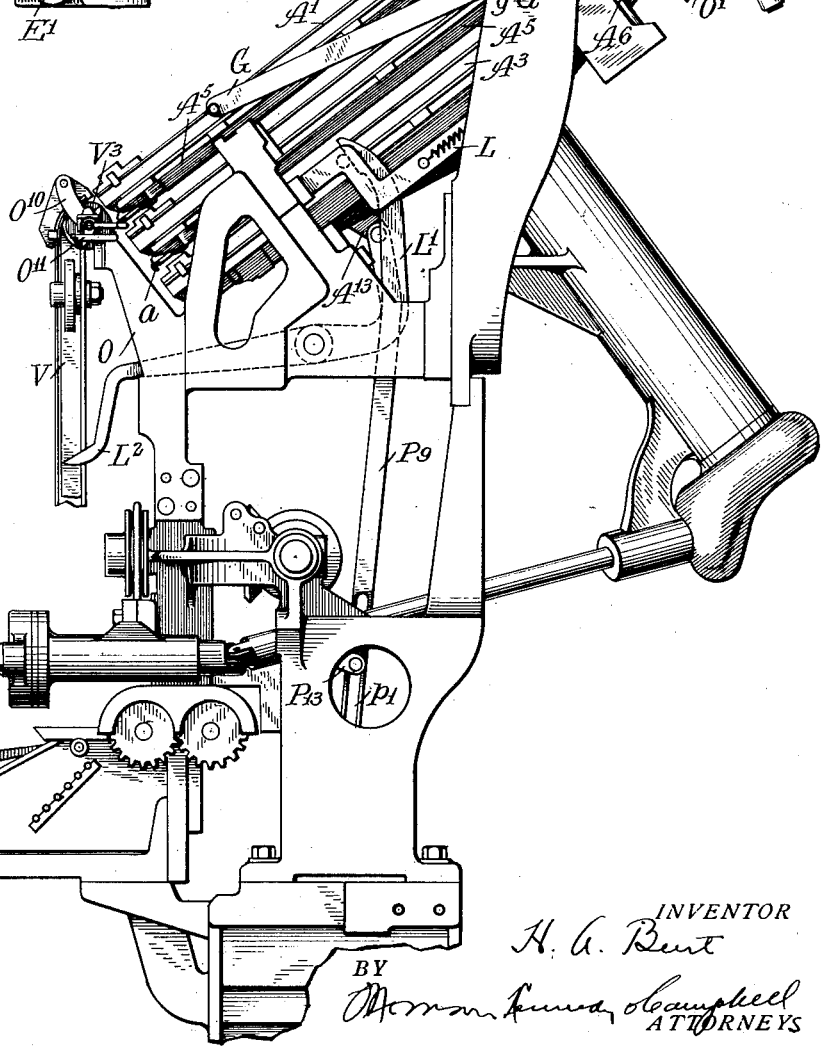

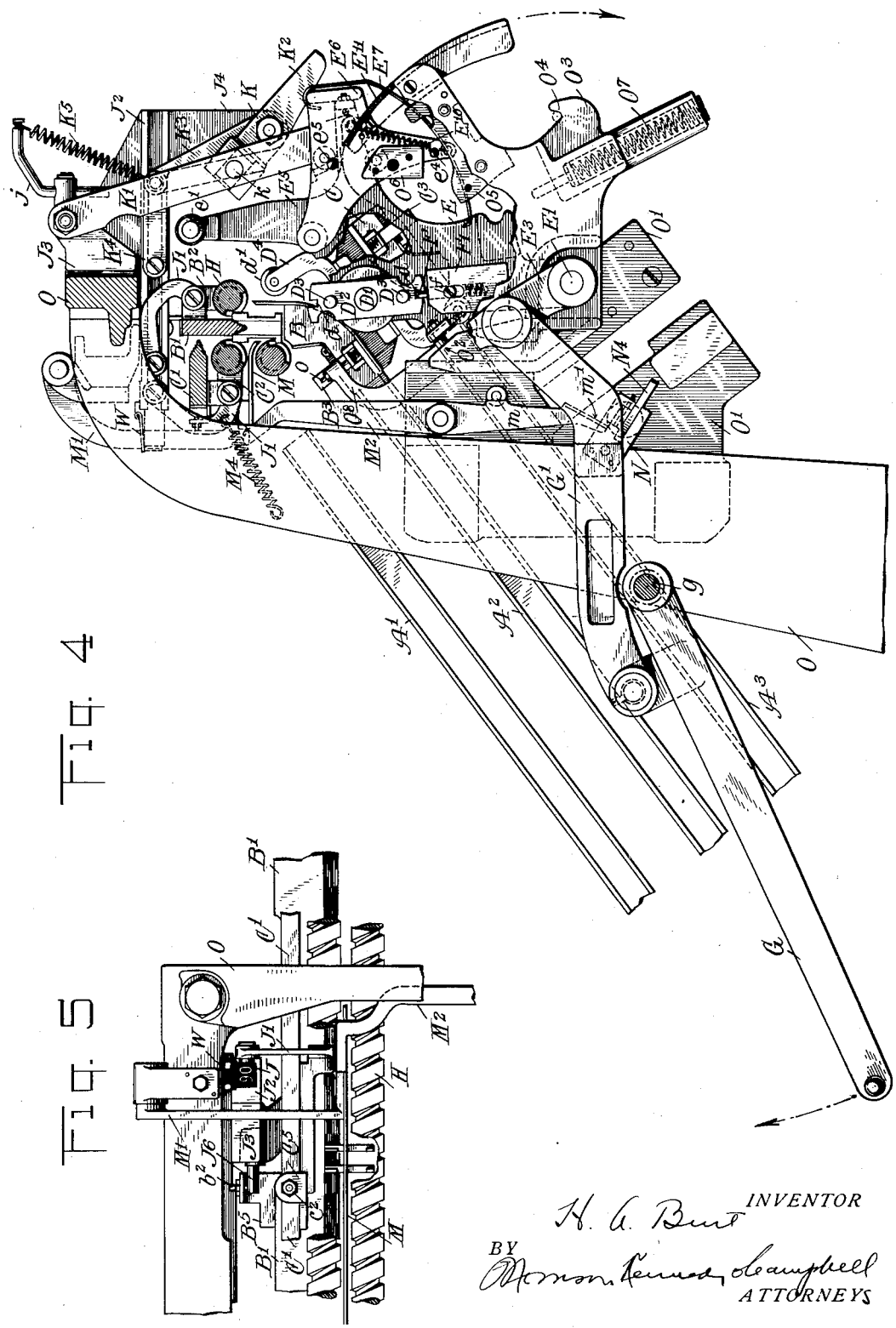

Oct. 3, 1933.  H. A. BURT  1,928,716
TYPOGRAPHICAL COMPOSING AND DISTRIBUTING MACHINE
Filed Nov. 10, 1931  15 Sheets-Sheet 4
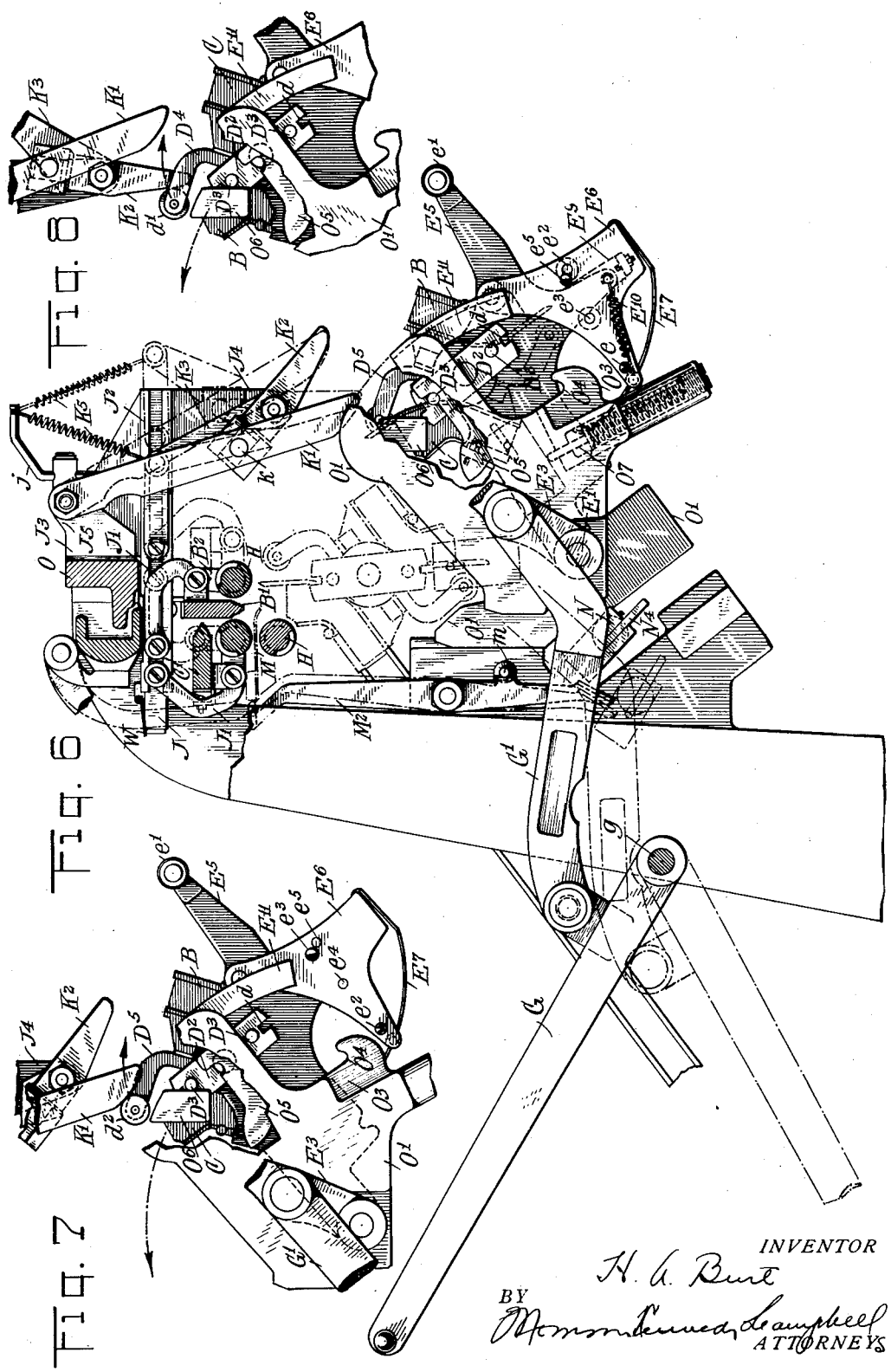
INVENTOR
H. A. Burt
BY
ATTORNEYS Oct. 3, 1933.   H. A. BURT   1,928,716
TYPOGRAPHICAL COMPOSING AND DISTRIBUTING MACHINE
Filed Nov. 10, 1931   15 Sheets-Sheet 5
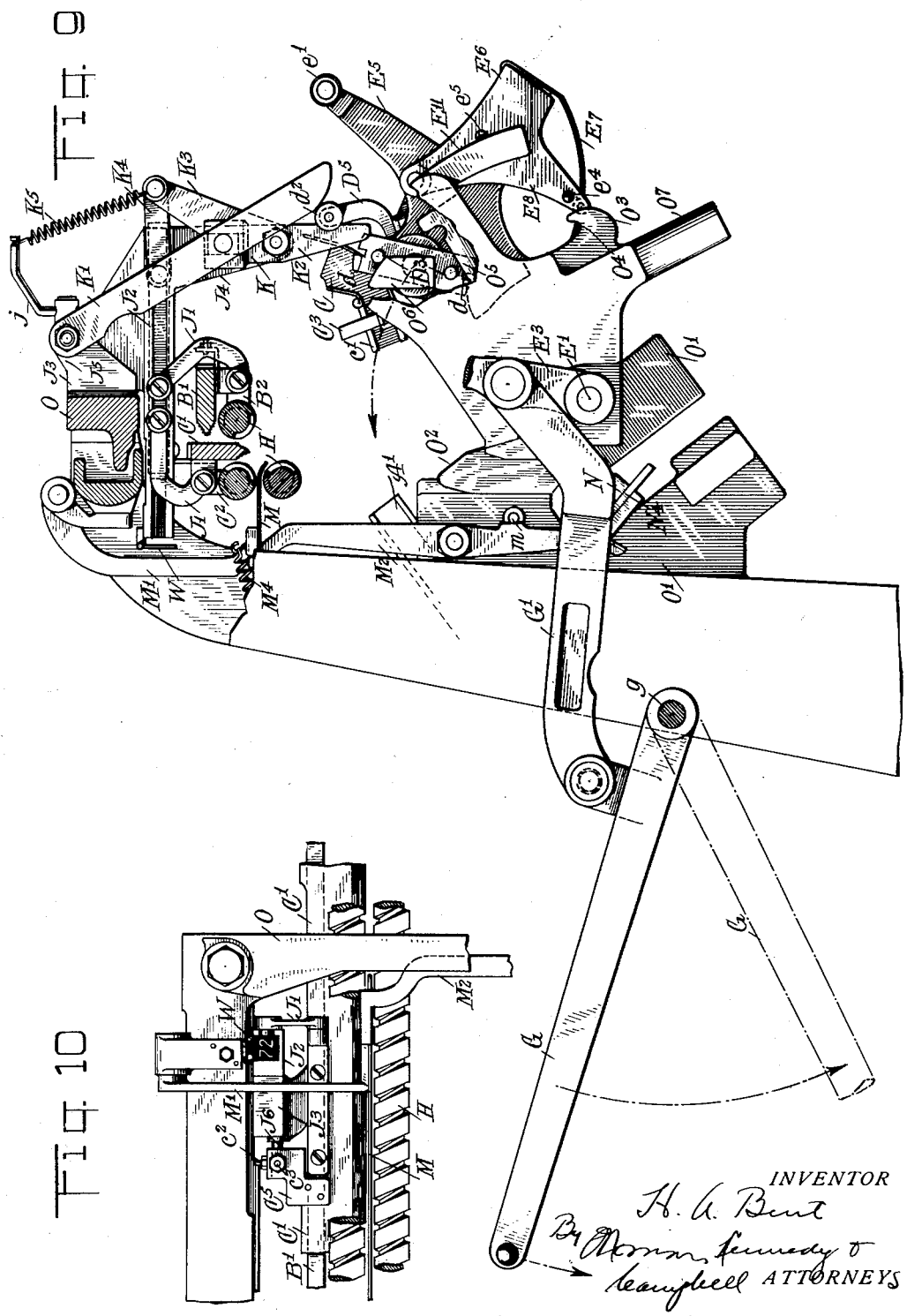

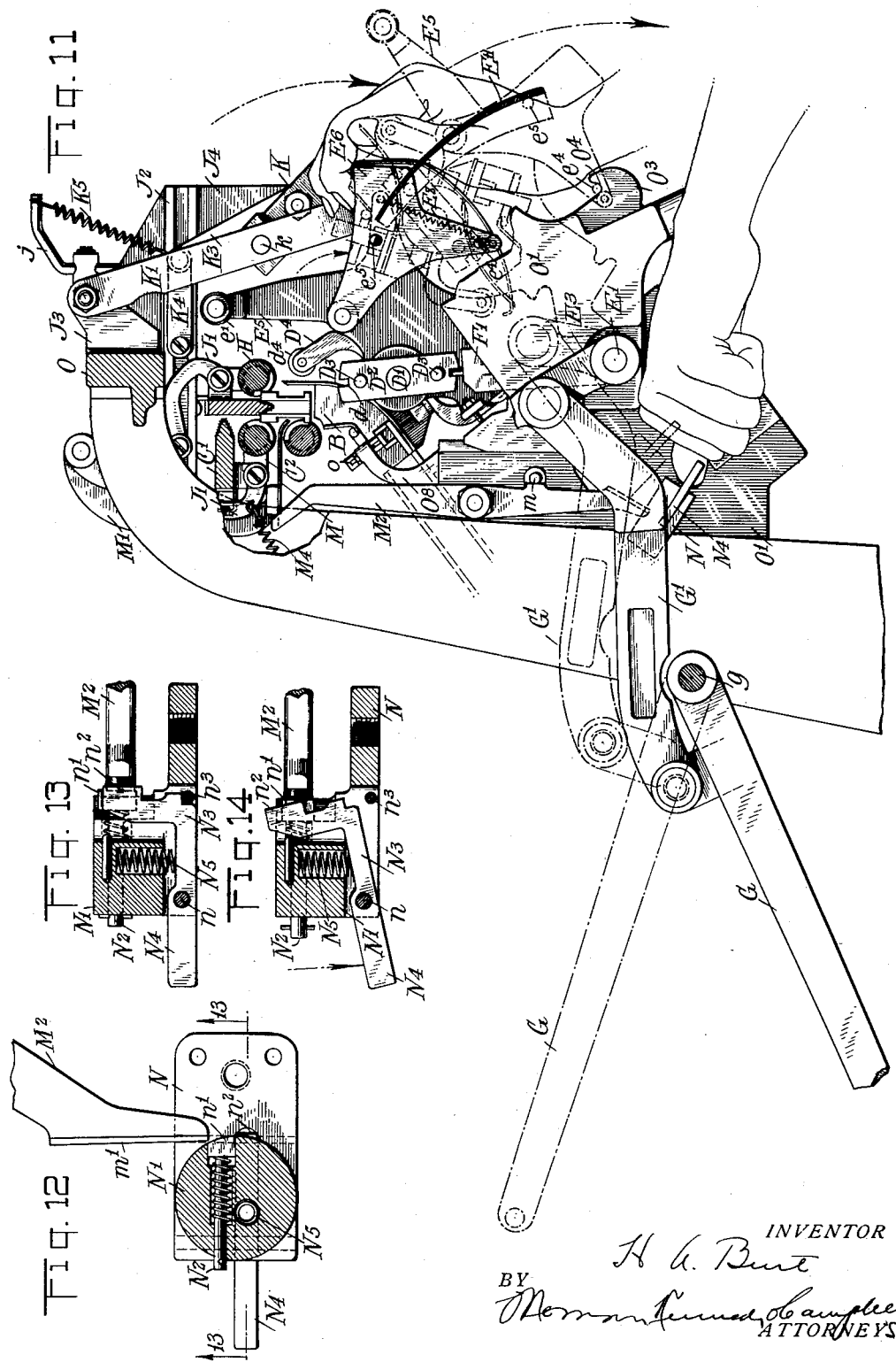

Oct. 3, 1933.  H. A. BURT  1,928,716
TYPOGRAPHICAL COMPOSING AND DISTRIBUTING MACHINE
Filed Nov. 10, 1931    15 Sheets-Sheet 7

INVENTOR
H. A. Burt
BY
ATTORNEYS

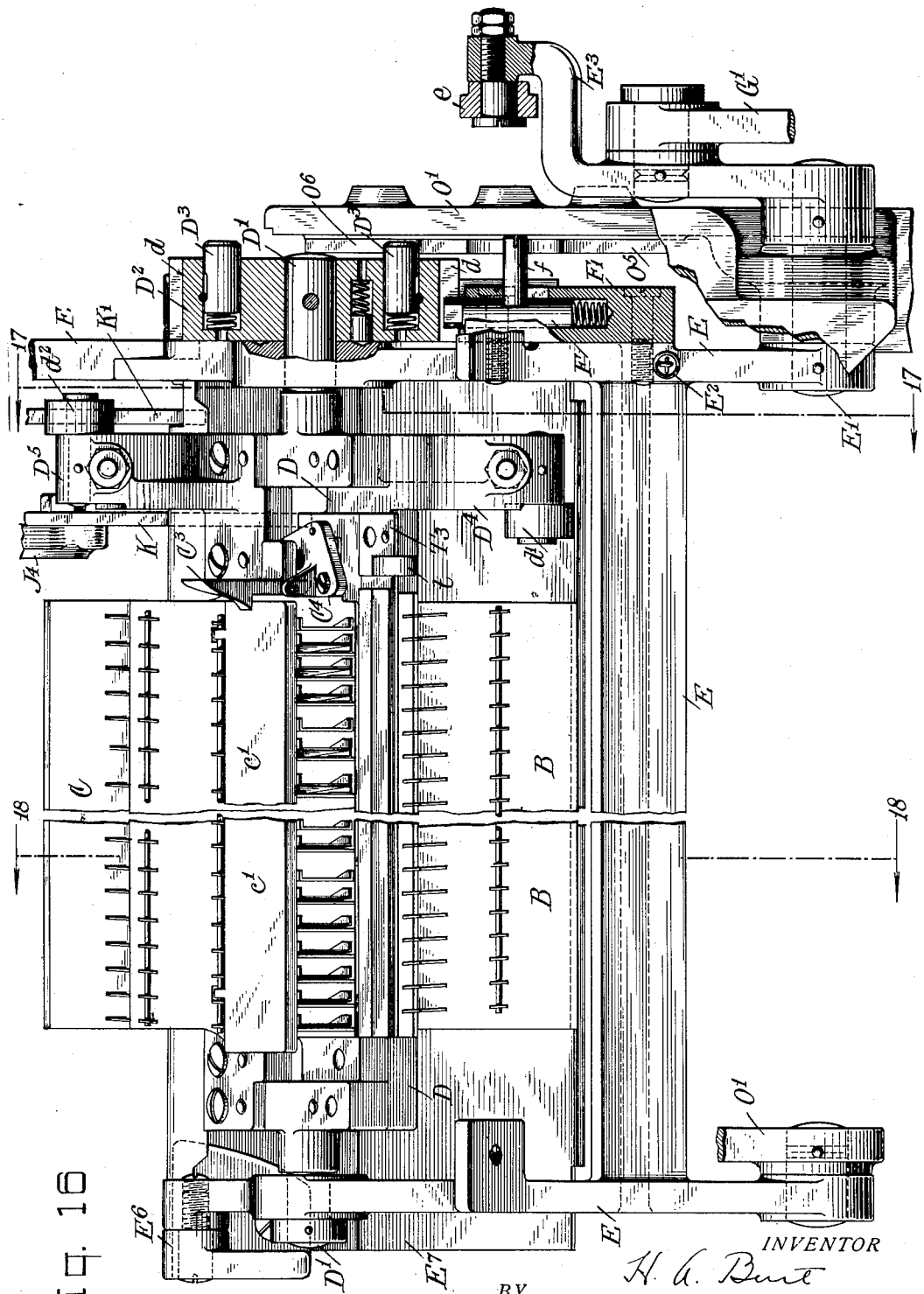

Oct. 3, 1933.  H. A. BURT  1,928,716
TYPOGRAPHICAL COMPOSING AND DISTRIBUTING MACHINE
Filed Nov. 10, 1931  15 Sheets-Sheet 9
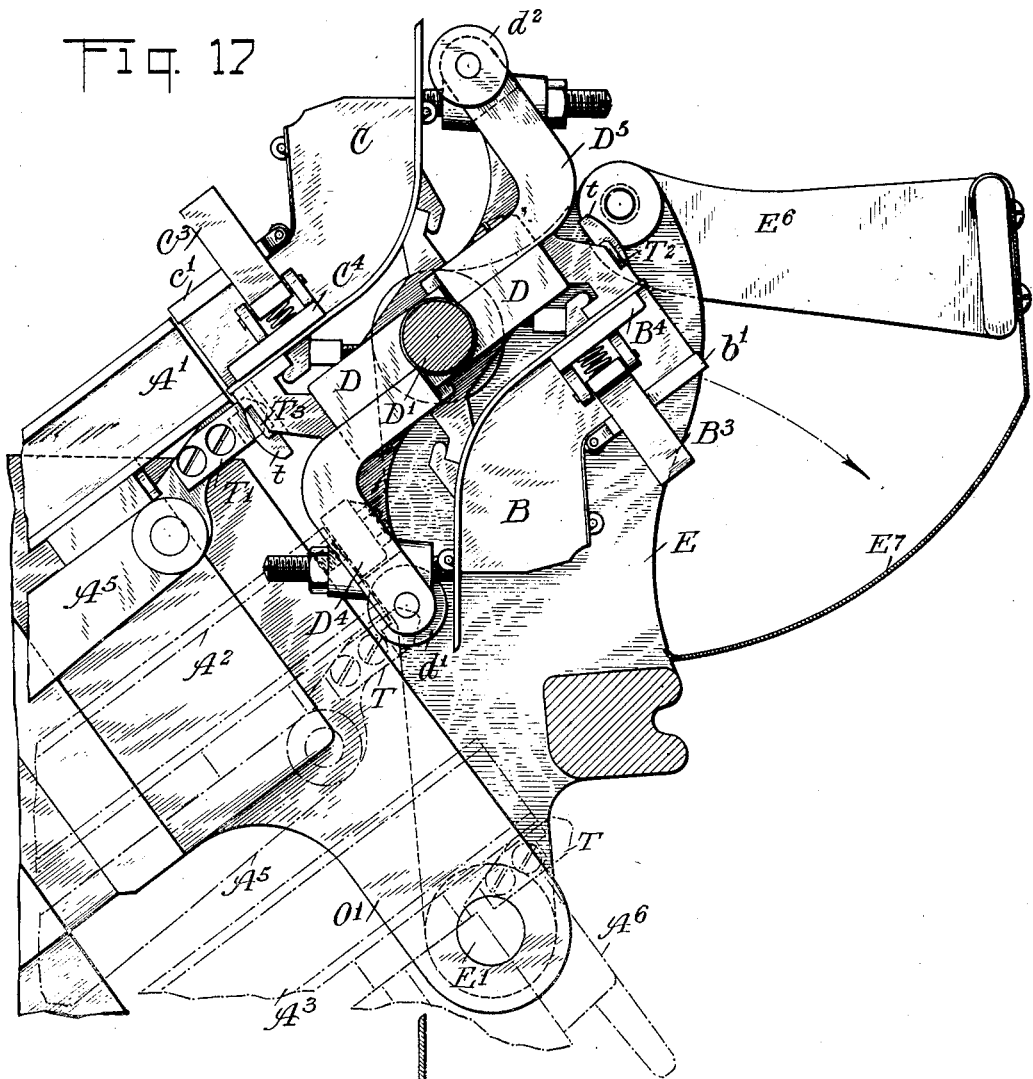
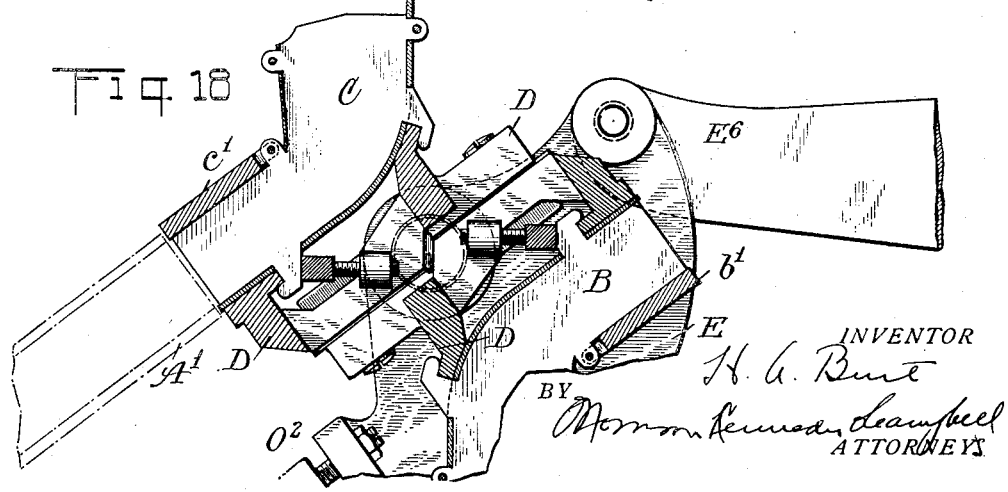

Oct. 3, 1933.    H. A. BURT    1,928,716
TYPOGRAPHICAL COMPOSING AND DISTRIBUTING MACHINE
Filed Nov. 10, 1931    15 Sheets-Sheet 10

Oct. 3, 1933.                H. A. BURT                1,928,716
             TYPOGRAPHICAL COMPOSING AND DISTRIBUTING MACHINE
                    Filed Nov. 10, 1931      15 Sheets-Sheet 11
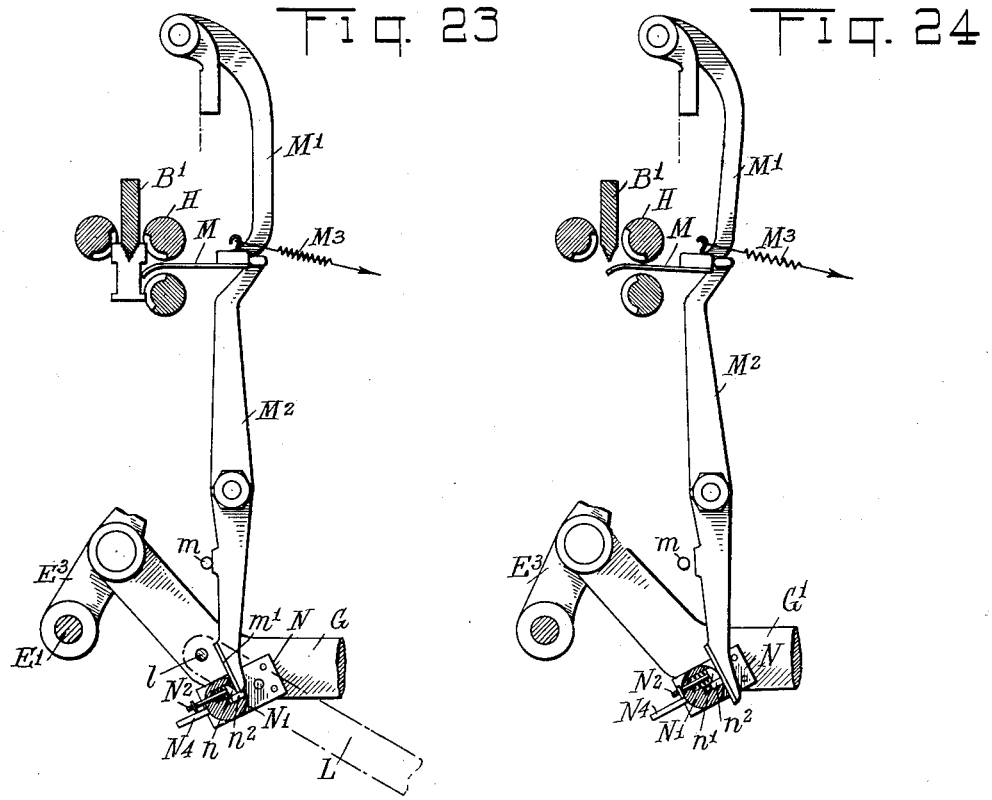
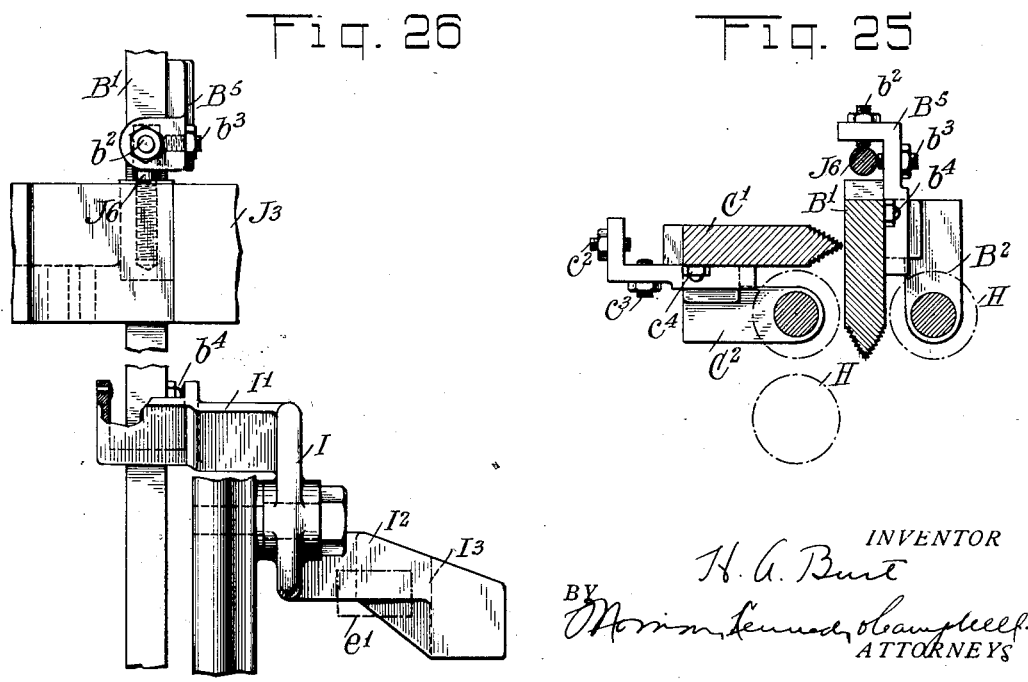

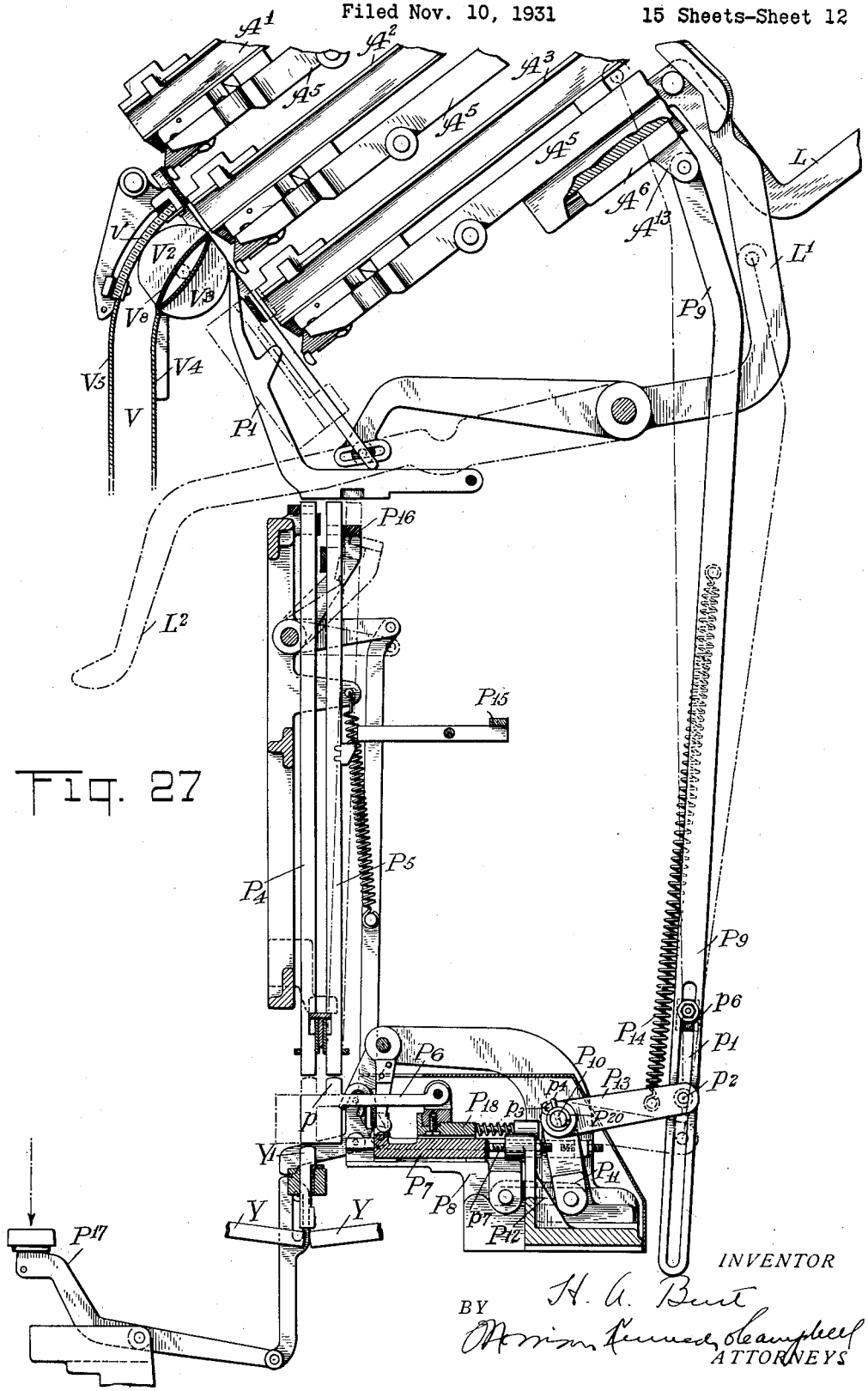

Oct. 3, 1933.  H. A. BURT  1,928,716
TYPOGRAPHICAL COMPOSING AND DISTRIBUTING MACHINE
Filed Nov. 10, 1931   15 Sheets-Sheet 13
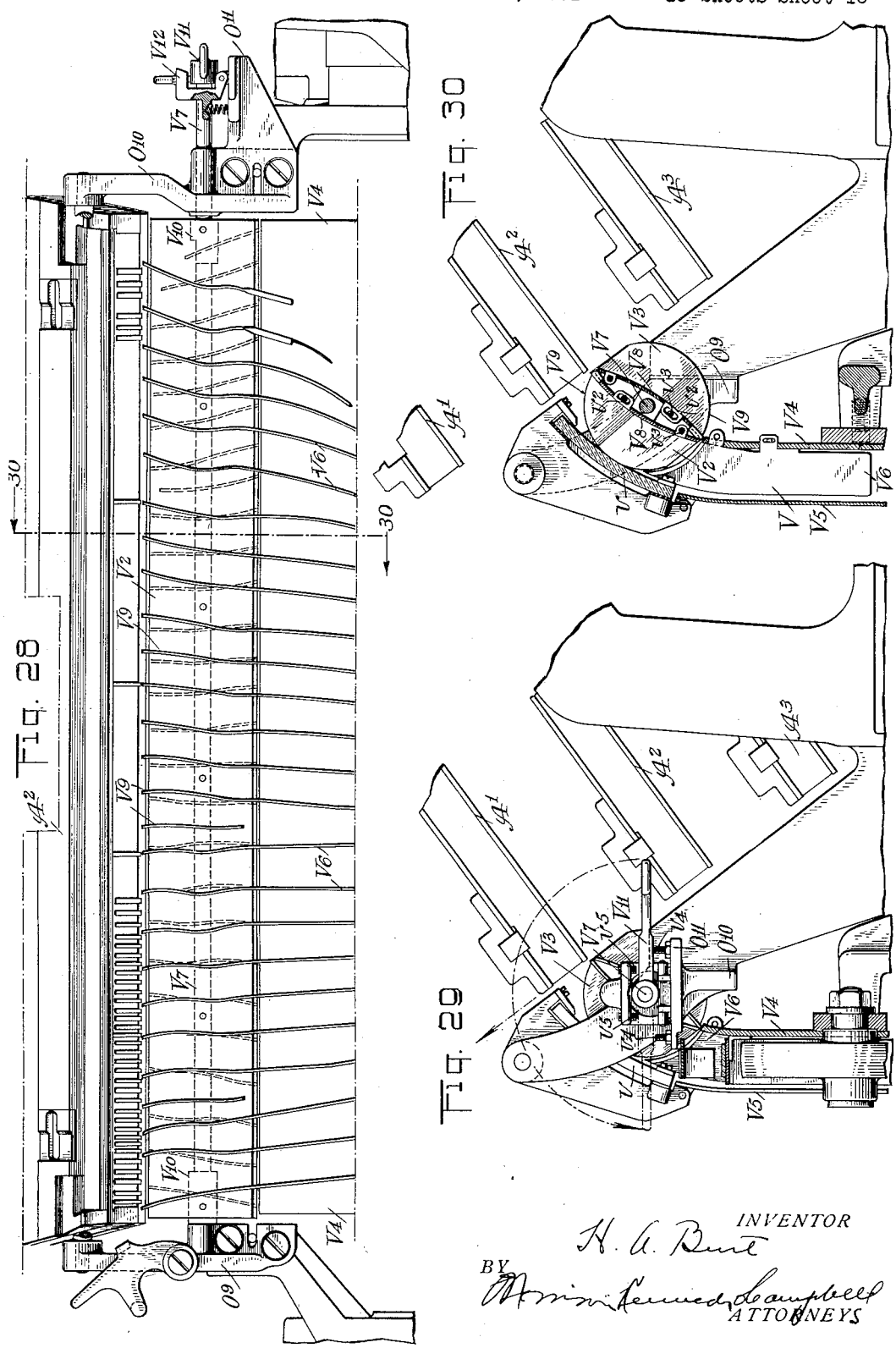

Oct. 3, 1933.  H. A. BURT  1,928,716
TYPOGRAPHICAL COMPOSING AND DISTRIBUTING MACHINE
Filed Nov. 10, 1931  15 Sheets-Sheet 14

INVENTOR
BY
ATTORNEYS

Oct. 3, 1933. H. A. BURT 1,928,716
TYPOGRAPHICAL COMPOSING AND DISTRIBUTING MACHINE
Filed Nov. 10, 1931 15 Sheets-Sheet 15

Patented Oct. 3, 1933

1,928,716

UNITED STATES PATENT OFFICE 1,928,716

TYPOGRAPHICAL COMPOSING AND DISTRIBUTING MACHINE

Harold A. Burt, St. Albans, N. Y., assignor to Mergenthaler Linotype Company, a corporation of New York Application November 10, 1931
Serial No. 574,116

53 Claims. (Cl. 199—16)

This invention relates to typographical composing and distributing machines, such as linotype machines of the general organization represented in Letters Patent of the United States to O. Mergenthaler, No. 436,532, wherein circulating matrices are released from a magazine in the order in which their characters are to appear in print and then composed in the line, the composed line transferred to the face of a slotted mold, the mold filled with molten metal to form a slug or linotype against the matrices which produce the type characters thereon, and the matrices thereafter returned through distributing mechanism to the magazine from which they started.

More particularly, it relates to that class of machines designed to handle matrix fonts which differ from one another in the size and number of characters. These fonts, for example, may be the ordinary ninety character fonts used exclusively for the composition of "straight" matter, and the special seventy-two or fifty-five character fonts used for the composition of head letter or display matter.

In machines of the particular class stated, it has been proposed to make use of two interchangeable magazine entrances and two interchangeable distributor bars in distributing matrices of the ordinary and display fonts, the tooth combinations of one distributor bar and the partitions of the corresponding entrance being equally spaced apart for handling the ordinary ninety character fonts, and the tooth combinations and partitions of the other bar and entrance being unequally spaced for handling the larger seventy-two character fonts (see the Kennedy Patent No. 1,698,636).

It has also been proposed to employ two interchangeable assembler throat sections, as well as an adjustable keyboard mechanism which is adapted under different conditions of adjustment to effect the release of corresponding matrices of the ordinary and display fonts (see the Rogers Patent No. 1,791,687).

While in the present machine the mounting of the distributor bars and magazine entrances is similar to that shown in the above Kennedy patent and the keyboard mechanism is substantially the same as that disclosed in the above Rogers patent, certain improvements have been incorporated to bring the machine to a higher state of perfection and to render it more satisfactory for commercial use.

Generally speaking, the improvements contemplated are as follows:

(1) the interchange of the distributor bars is controlled by the rotary movement of the magazine entrances, thereby insuring the proper relationship between the bars and entrances at all times;

(2) the operation of the distributing mechanism is automatically arrested, and the restarting thereof prevented, if the magazine entrance and distributor bar selected do not correspond to the magazine in use;

(3) the interchange of the magazine entrances and distributor bars is prevented while matrices are in course of distribution, thus avoiding clogging of the distributor and possible damage to the matrices;

(4) the adjustment of the keyboard mechanism is automatically controlled to accord with the magazine brought into use by the vertical movement of the magazine shift frame; and (5) the peculiar design and arrangement of the assembler throat sections are such as to permit full visibility and complete accessibility at the delivery end of the magazine.

These and other improvements will best be understood from the detailed description to follow.

In the accompanying drawings, the invention has been shown merely in preferred form and by way of example, and obviously many changes and variations may be made therein without departing from its spirit. It is to be understood, therefore, that the invention is not limited to any specific form or embodiment except insofar as such limitations are specified in the claims.

In the drawings:

Fig. 2 is a side elevation partly broken away and taken on the line 2—2 of Fig. 1;

Fig. 3 is a fragmentary elevation, similar to the upper part of Fig. 2, showing the distributor clutch controlling dog engaged;

Fig. 4 is an enlarged side elevation, partly in section, of the distributing mechanism and associated parts;

Fig. 5 is a fragmentary front elevation of certain of the parts shown in Fig. 4;

Fig. 6 is a view similar to Fig. 4, but showing the parts in the positions they are caused to assume when the rocking frame E is lowered;

Fig. 7 is a view similar to Fig. 6 showing the manner of effecting the interchange of the distributor bars and the relative position of the parts while bringing the special bar into use;

Fig. 8 is a view similar to Fig. 7 showing the relative position of the parts while bringing the regular distributor bar into use;

Fig. 9 is a view similar to Figs. 4 and 6, but showing the position of the parts immediately after the interchange of the bars is completed;

Fig. 10 is a fragmentary front elevation of certain of the parts shown in Fig. 9;

Fig. 11 is a view similar to Fig. 4, showing the manner of releasing the rocking frame preparatory to lowering it for access to the magazines;

Fig. 12 is an enlarged vertical section taken through the safety device employed for locking the magazine entrances against interchange while matrices are on the distributor bar;

Fig. 13 is a horizontal section taken on the line 13—13 of Fig. 12, and showing the pivoted interponent in its normal or active position;

Fig. 14 is a similar section showing the interponent rocked to inactive position;

Fig. 16 is an enlarged front elevation, partly in section, of certain of the parts shown in Fig. 4;

Fig. 17 is a vertical section taken on the line 17—17 of Fig. 16;

Fig. 18 is a similar section taken on line 18—18 of Fig. 16;

Fig. 23 is a fragmentary side view, illustrating the manner of locking the hand lever when matrices are in the course of distribution;

Fig. 24 is a similar view, but showing the parts in a different position and the hand lever released;

Fig. 25 is an enlarged detail section showing the abutment for the distributor bars;

Fig. 26 is a detail plan view showing the means for locking the bars against said abutment;

Fig. 27 is a vertical section, partly in elevation, through the assembling and keyboard mechanisms;

Fig. 28 is a front view of the upper portion of the assembler entrance with the ordinary cover plate removed;

Fig. 29 is a side view partly in section of the parts shown in Fig. 28;

Fig. 30 is a vertical section taken on the line 29—29 of Fig. 28;

The present machine (see Figs. 1, 2 and 4) is equipped with three superposed main magazines $A^1$, $A^2$, $A^3$, and three auxiliary magazines $A^4$, arranged side by side or in tandem. The two lower main magazines $A^2$, $A^3$, are of standard form, each being provided with ninety-one grooves or channels spaced apart in the usual way to adapt them to contain a regular 90-character font; whereas, the top or first main magazine $A^1$, although of the same width as the magazines $A^2$ and $A^3$, is provided with only seventy-three grooves or channels spaced apart in a different manner to adapt it to contain a 72-character display font.

The magazines $A^1$, $A^2$, $A^3$, of the main series are mounted on separate base frames $A^5$ constituting parts of a shift frame $A^6$ which is arranged to be raised and lowered in the well-known manner, by operation of a hand crank R, so as to bring any selected one of the magazines into operative position.

Figure 35:
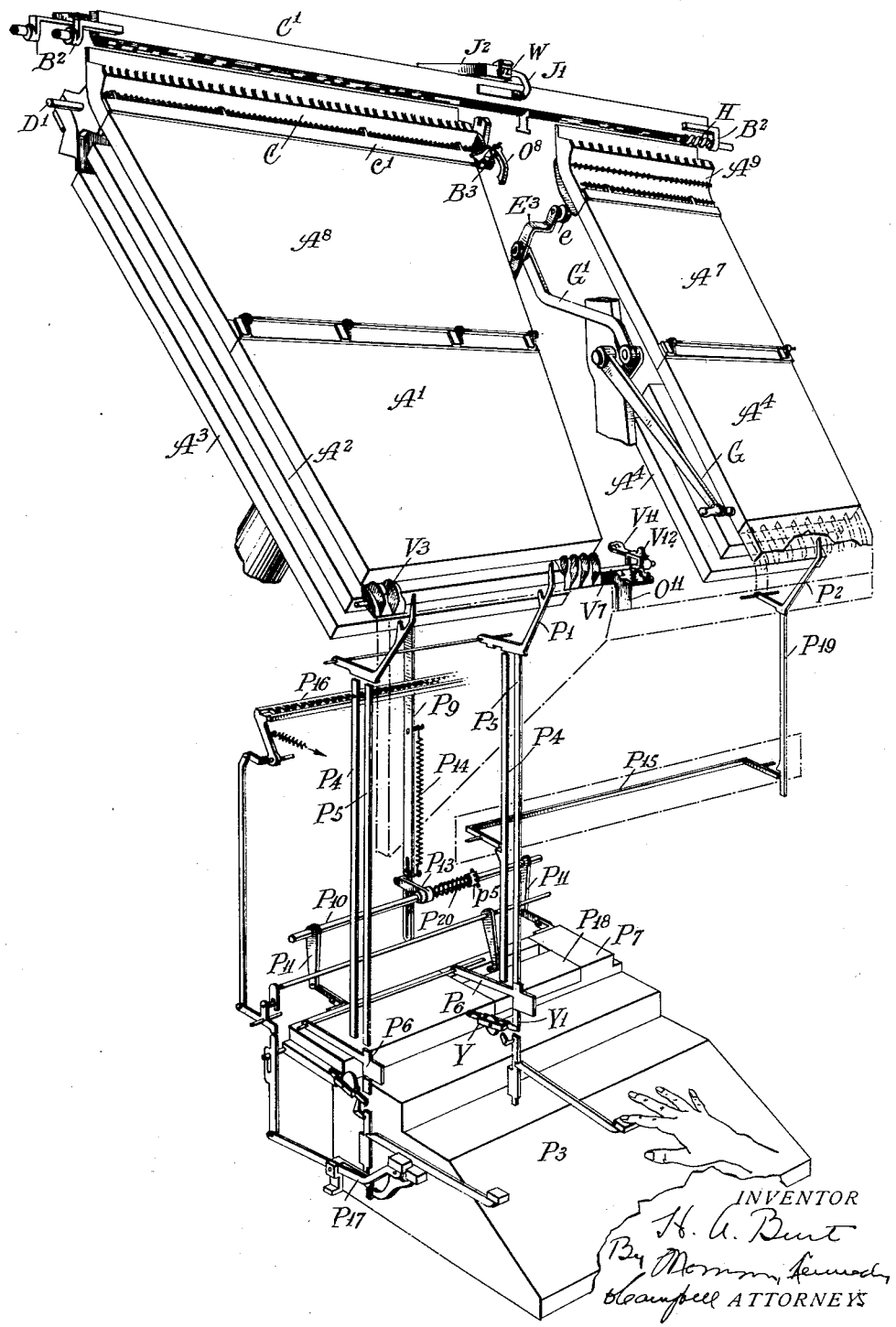
Fig. 35 is a skeleton perspective view showing diagrammatically the various connections throughout the improved machine.

The three magazines $A^4$ of the auxiliary series are similarly mounted, although moved upwardly and downwardly by a separate hand crank $R^1$ (Fig. 1), so that the matrix fonts stored therein may be used in conjunction with any selected font carried in the main magazines. Being of the short and narrow variety, however, the auxiliary magazines $A^4$ have associated therewith a channeled conductor $A^7$ (common to all) for directing the matrices from the distributing mechanism into the upper or receiving end of the magazine in use (see Fig. 35).

Preferably, the top main magazine $A^1$, like the auxiliary magazines $A^4$, is also made of reduced length and is connected to the distributing mechanism by a channeled conductor $A^8$, mounted therewith on the top base frame $A^5$.

When either of the two lower main magazines $A^2$, $A^3$, is in operative position, the regular magazine entrance B is employed to deliver the matrices thereto from the distributing mechanism, and when the top main magazine $A^1$ occupies such operative position, the special magazine entrance C is so employed. The two entrances differ in the number and spacing of their partition plates, the entrance B presenting ninety-one channels to cooperate with the magazines $A^2$, $A^3$, and the entrance C presenting but seventy-three channels to cooperate with the magazine $A^1$. The entrances B and C, arranged in inverted relation to each other, are rotatably mounted so that either may be brought into the operative position, as desired. Their individual supporting frames D are fastened together and constitute a reversible holder or support which is journalled by means of trunnions $D^1$ in a rocking frame E and is provided with a block $D^2$ by which it may be given successive half rotations to bring first one entrance and then the other into use.

Figure 15:
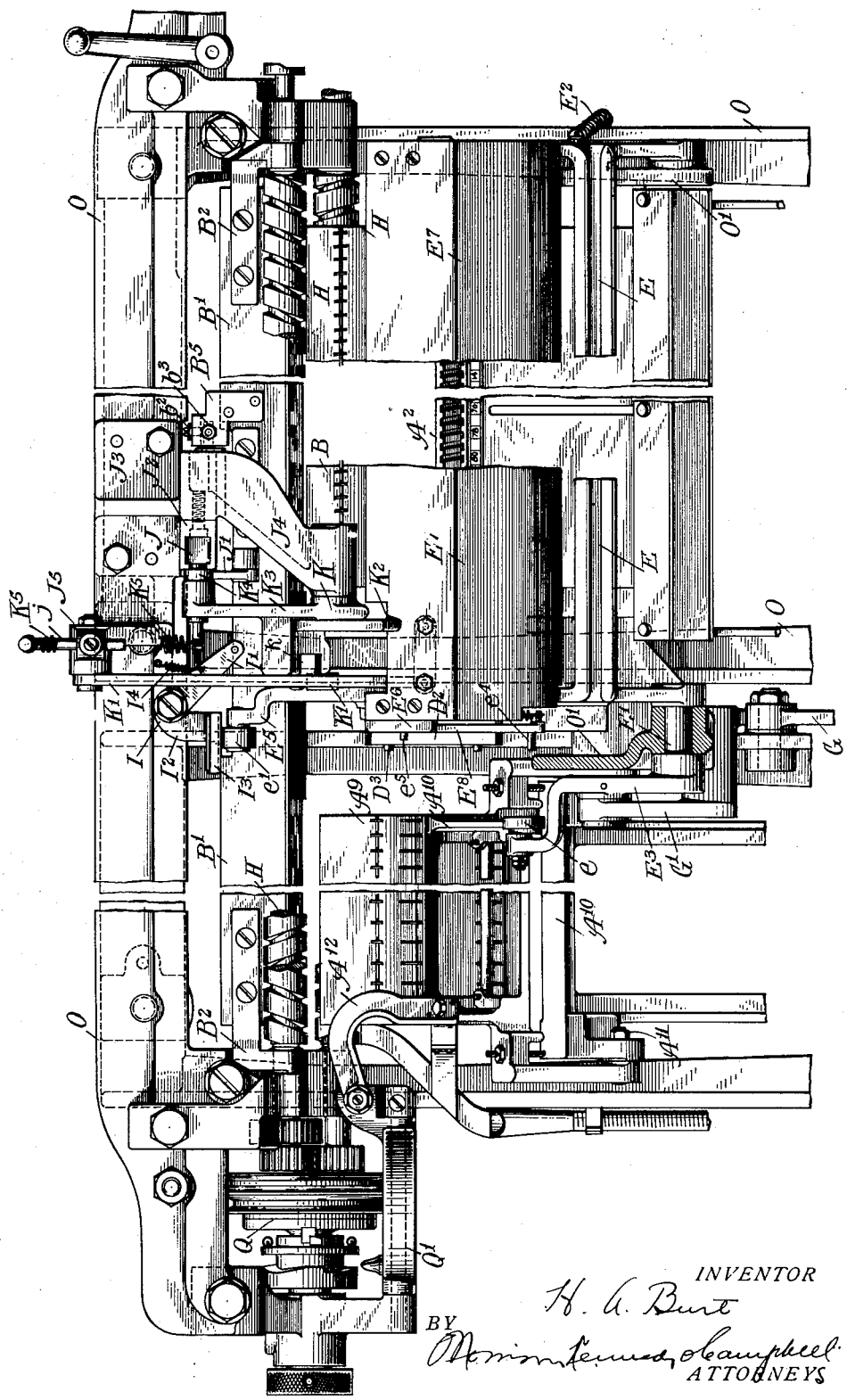
Fig. 15 is a rear elevation of the parts shown in Fig. 4.
Figure 19:
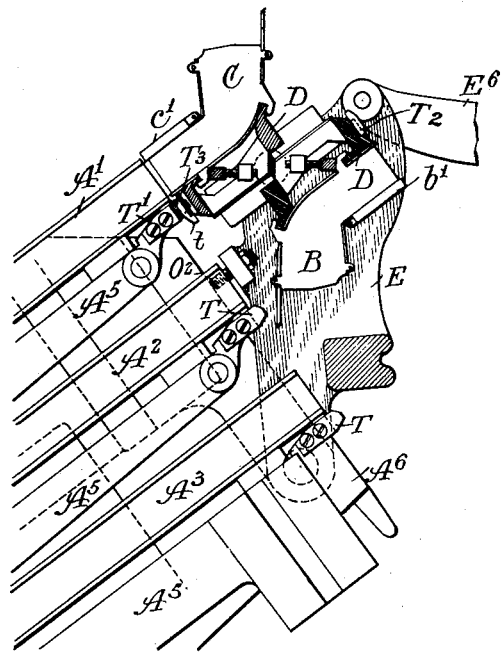
Fig. 19 is a vertical section taken through the magazine entrances and showing, in elevation, the clutch controlling cam plates associated with the individual magazines.

The frame E (see Figs. 4 and 15) is hingedly mounted at $E^1$ between fixed right and left hand brackets $O^1$ of the distributor frame O, and is held in upright position against lugs $O^2$ (Fig. 4) under the tension of pull springs $E^2$ (see Fig. 15). The lugs $O^2$ are disposed in the path of set screws $e$ mounted in the rocking frame E and serve to locate the selected magazine entrance in the operative position.

The entrances B and C are locked against rotation by a spring latch F, which is slidably mounted within a plate $F^1$ secured to the frame E and arranged to engage corresponding notches formed in the block $D^2$. When it is desired to interchange the entrances, the rocking frame E is swung downwardly a limited distance about the axis $E^1$ and then back to its normal position against the lugs $O^2$, these operations being effected by means of a conveniently located hand lever G pivoted at $g$ to the distributor frame O and connected through a link $G^1$ to a rigid upright arm $E^3$ of the rocking frame E. During the swinging movements of the frame E, the entrance holder and its latch F are brought under the control of a pair of cam plates $O^5$, $O^6$, fastened to the fixed right-hand bracket $O^1$. These cam plates are arranged to cooperate with the releasing pin $f$ of the latch F and also with a pair of studs $D^3$ located at diametrically opposite points in the rotating block $D^2$.

The form and disposition of the cam plates $O^5$ and $O^6$ are such that, by operating the hand lever G, the entrances B and C will be first released, then given the required half turn to effect their interchange, and finally relocked to the plate $F^1$ of the frame E. A spring plunger $O^7$, mounted in the lower end of the bracket $O^1$ and disposed in the path of the plate $F^1$, relieves the parts of shocks as the frame E completes its downward movement and tends to facilitate their operation.

The distributor proper comprises two distinct distributor bars $B^1$, $C^1$, and a common set of matrix conveying screws H. The bar $B^1$ is provided with ninety-one tooth combinations equally spaced apart to correspond to the spacing of the matrix channels in the magazine entrance B and the regular magazines $A^2$, $A^3$; whereas, the bar $C^1$ is provided with only seventy-three combinations which are unequally spaced apart to correspond to the spacing of the matrix channels in the magazine entrance C and the special magazine $A^1$. The distributor bars $B^1$ and $C^1$ (Figs. 4 and 15) are pivotally mounted so that either may be rocked into operative relation to the conveying screws H, being provided at their opposite ends with bracket plates $B^2$, $C^2$, respectively, which are journalled on the reduced end portions of the two upper conveying screws H.

Each distributor bar is connected by a curved link $J^1$ to a reciprocable overhead slide rod J mounted in fixed horizontal guideways $J^2$ secured to a bracket $J^3$ bolted to the cross beam of the distributor frame O. By moving the rod J backwardly and forwardly in the guideways $J^2$, the distributor bars $B^1$ and $C^1$ are transposed, first one and then the other being brought into operative position.

Figure 1:
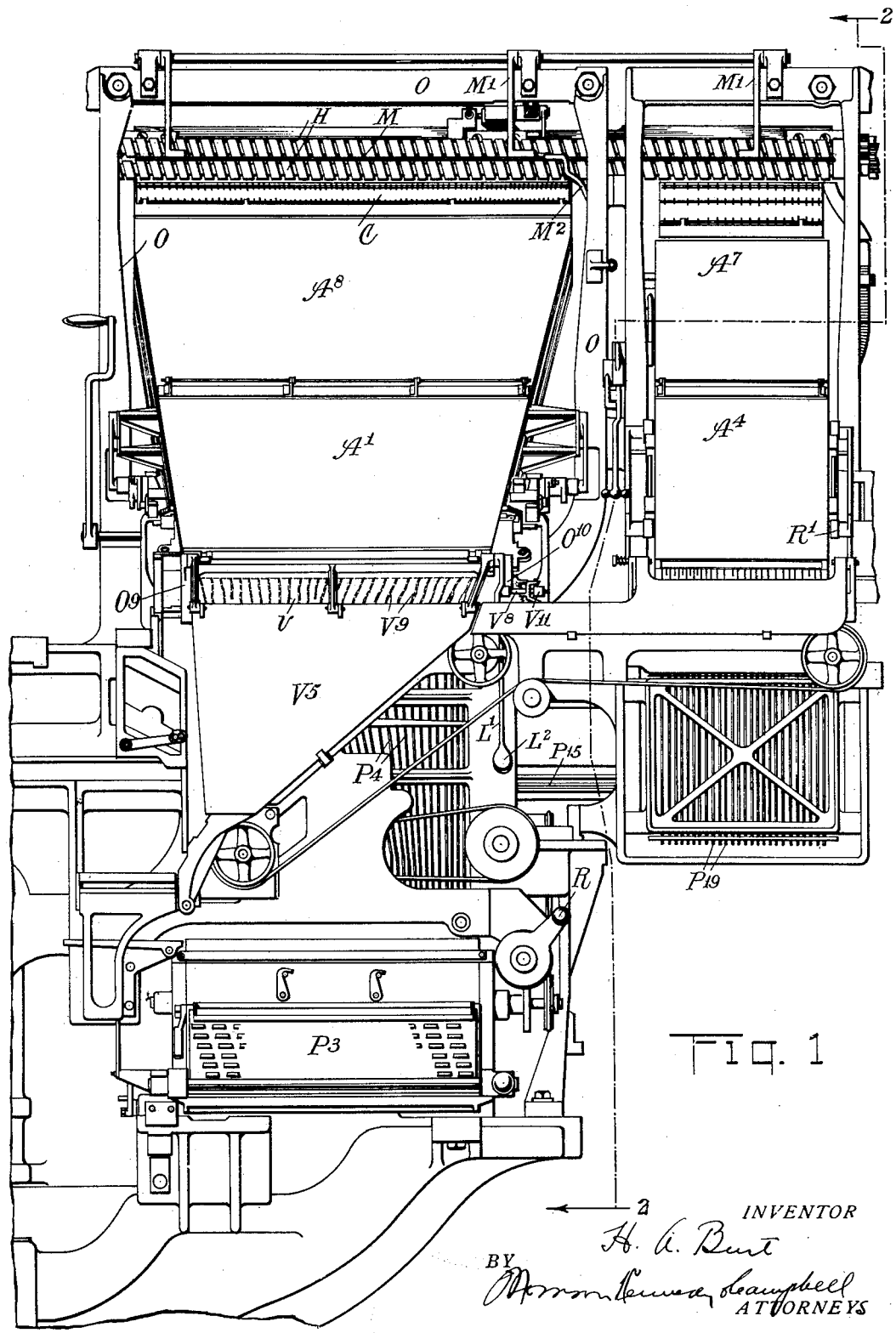
Fig. 1 is a front elevation of a linotype machine equipped with the present improvements.

So far as described, the parts, their construction, and mode of operation are or may be the same as disclosed in the Kennedy and Rogers patents before mentioned and to which reference may be had if desired. Coming now to the present improvements:

As best shown in Figs. 1 and 15, the distributor bars $B^1$ and $C^1$ are extended to the right above the single curved entrance $A^9$ for the auxiliary magazines $A^4$, and the cross beam of the distributor frame O is likewise extended so as to support the ordinary distributor clutch Q and other closely related parts, including the controlling dog $Q^1$.

The auxiliary entrance $A^9$ is mounted on a suitable supporting frame $A^{10}$ pivoted to swing to and from its operative position on a fixed axis $A^{11}$ which is located (see Fig. 3) forwardly of the axis $E^1$ of the rocking frame E. The supporting frame $A^{10}$ (as may be observed from Fig. 15) is provided with a curved bracket arm $A^{12}$ projecting from one of the side members thereof and which is adapted during the normal operation of the machine, to hold the clutch controlling dog $Q^1$ out of action. At such times, the auxiliary entrance $A^9$ is maintained in its operative position by the spring $E^2$ before mentioned and whose influence is imparted to the entrance through the medium of the upright arm $E^3$, the latter being offset at the top and provided with an anti-friction roller $e$ arranged to engage the other side member of the entrance frame $A^{10}$.

When the rocking frame E is lowered, the auxiliary magazine entrance $A^9$ will be lowered simultaneously under control of the arm $E^3$, and the arm $A^{12}$ will be moved out of engagement with the dog Q, which is thus allowed to disengage the clutch and stop the operation of the distributing mechanism. Conversely, when the rocking frame E is raised, the magazine entrance $A^9$ is pushed upwardly by the arm $E^3$, and the arm $A^{12}$ is caused to engage and rock the dog $Q^1$ back to its inactive position, thereby allowing re-engagement of the clutch Q and restarting the operation of the distributing mechanism.

By reference to Fig. 3, it will be seen that only a slight movement of the rocking frame E from its upper or normal position is required to trip the distributor clutch Q through the connections just described, and it is proposed to take advantage of this condition by introducing means, subsidiary to the hand lever G, which will tilt the said frame E rearwardly (and in this way stop the operation of the distributing mechanism) when, in shifting the magazines, the one selected does not correspond to the selected magazine entrance.

Such means (see Figs. 19, 20, 21 and 22,) include two small cam plates T fastened to the base frames of the regular main magazines $A^2$, $A^3$, respectively, and a similar plate $T^1$ fastened to the base frame of the special main magazine $A^1$. These cam plates T and $T^1$ project rearwardly beyond the upper or receiving ends of the magazines so as to cooperate with one or the other of a pair of corresponding cam plates $T^2$, $T^3$, carried by the individual supporting frames D of the magazine entrances B and C. The latter cam plates $T^2$, $T^3$, are provided with tongues $t$ adapted under normal conditions to engage in corresponding open grooves or recesses $t^1$ formed in the cam plates T and $T^1$, respectively.

It is pointed out (see Fig. 22) that the tongue $t$ of the plate $T^2$, which is associated with the regular magazine entrance B, while vertically alined with the grooves $t^1$ in the cam plates T of the regular magazines $A^2$, $A^3$, is disposed directly in the path of the cam plate $T^1$ of the special magazine $A^1$; and that the tongue $t$ of the plate $T^3$, which is associated with the special magazine entrance C, while vertically alined with the groove $t^1$ of the cam plate $T^1$ of the special magazine $A^1$, is disposed directly in the path of the cam plates T. Consequently, if the special magazine entrance C happened to be in use and the shift frame $A^6$ by mistake were elevated so as to bring one of the regular magazines $A^2$ or $A^3$ into the operative position (the condition depicted in Fig. 20), the cam plate T would engage the tongue $t$ of the plate $T^3$ and tilt the frame E rearwardly to stop the distributor. On the other hand, if the selected magazine and entrance should happen to correspond, the tongue $t$ would engage in the groove $t^1$ and thus leave the frame E undisturbed. When the interchange of the entrances is effected subsequently to the interchange of the magazines, the rocking frame E would be either arrested by the cam plates in the position shown in Fig. 20, or allowed to reach its normal position shown in Fig. 19, according to the particular entrance selected.

The upper curved plates of the magazine entrances B and C are provided as usual with hinged plate sections $b^1$, $c^1$, respectively, which are adapted to yield and thus prevent damage to the parts in the event a matrix should become lodged between the magazine and entrance in use when the shift frame $A^6$ is raised or lowered. In the present instance, these plate sections are held in place against movement, while the entrances are rotated for interchange, by spring latch members $B^3$, $C^3$, so as to avoid unnecessary noise and vibration during this operation and also possible interference with the distributor screws as the rocking frame E completes its upward movement. As best shown in Figs. 15 and 17, the latch members $B^3$, $C^3$ are pivotally mounted on small base plates $B^4$, $C^4$, secured to lateral extensions of the lower curved plates of the respective entrances B and C, and are moved automatically to inactive position to release the associated plate sections $b^1$, $c^1$, by a stop screw $o$, the latter (see Figs. 4 and 11) being mounted at the upper end of an arm $O^8$ rising from the right-hand main bracket $O^1$, and arranged to engage the latch members as the individual entrances are brought into operative position.

As another feature of the invention, it is proposed to operate the slide rod J, which controls the interchange of the distributor bars $B^1$, $C^1$, from the rotatable holder which supports the magazine entrances B, C, in order to obviate the difficulties arising from the bringing of bars and entrances into use that do not correspond. To this end (reference being directed to Figs. 16 and 17 and also to Figs. 4 to 11, inclusive), the frames D of the said holder are formed with integral fingers $D^4$, $D^5$, which extend therefrom at diametrically opposite points to positions alongside the respective magazine entrances B and C.

The fingers $D^4$ and $D^5$ (see Fig. 16) are provided at their free or outer ends with anti-friction rollers $d^1$, $d^2$ disposed in different vertical planes and alined with a pair of upright levers K, $K^1$, so that they will engage and push the lower ends of said levers alternately rearward during successive half rotations of the entrance holder. The lever K is angular in form and pivoted to an arm $J^4$ depending from the fixed bracket $J^3$, whereas the lever $K^1$ is straight and pivoted at its upper end to a higher extension $J^5$ of said bracket. The lower arm $K^2$ of the lever K is arranged in the path of the roller $d^1$, and the lower end of the lever $K^1$ is disposed in similar relation to the roller $d^2$. The upper arm of the lever K is connected by a horizontal link $K^4$ to the slide rod J and is also connected by means of a lateral slotted lug and pin $k$ to the lever $K^1$. As a result of this latter connection, each lever will be moved by the other back to its original position when they are actuated by the corresponding rollers $d^1$, $d^2$. The rod J is thus reciprocated in the guideways $J^2$, and first one and then the other of the distributor bars $B^1$ and $C^1$ is brought into operative position.

Stated more specifically, and assuming the parts to occupy the position shown in Fig. 4 with the regular distributor bar $B^1$ and regular magazine entrance B in use: when the hand lever G is raised, the rocking frame E through the link $G^1$ and arm $E^3$ will be swung downwardly, and the latch F will be withdrawn from the rotating block $D^2$, as before described. The block $D^2$ is then given a partial turn, clockwise, by the engagement of the stud $D^3$ (the one nearer the latch) with the cam plate $O^5$, and is finally stopped in the position shown in Fig. 6, the said stud at this time being located in engaging relation to the cam plate $O^6$, and the finger $D^5$ associated with the entrance C being located in engaging relation to the lower end of the lever $K^1$.

On the return or upward movement of the frame E, the stud $D^3$ is moved against the rear face of the cam plate $O^6$ (Fig. 7) so as to turn the entrance holder through the remaining number of degrees and complete the half turn required to reverse the position of the entrances. By this latter operation, too, the roller $d^2$ of the finger $D^5$ is forced against the lever $K^1$ and swings it rearwardly (Fig. 7). As a result, the lever K is also actuated by means of the connecting pin $k$ so as to pull the slide rod J backwardly and thus rock the special distributor bar $C^1$ into operative position (see Fig. 9).

Incidentally, the lower arm $K^2$ of the lever K is moved forwardly to a position where it will be engaged by the finger $D^4$ associated with the regular magazine entrance B when the hand lever G is later operated to bring that entrance again into use. Fig. 8 shows the relation of the parts under this subsequent operation and at the moment when the rocking frame E is stopped in its lowermost position by the engagement of the other stud $D^3$ with the cam plate $O^6$. In this instance, as the frame is raised the lower arm $K^2$ of the lever K is forced rearwardly by the roller $d^1$ of the finger $D^4$, and the upper arm $K^3$ of the lever is caused to push the slide rod J forwardly thereby restoring the regular bar $B^1$ to operative position and, through the connecting pin $k$, swinging the lever $K^1$ back to its original position in readiness for the next succeeding operation (see Fig. 4).

A pull spring $K^5$, connected to the upper end of the lever K and anchored to a bent rod $j$ projecting rearwardly from the bracket $J^3$, facilitates the operation of the slide rod J and assists in overcoming the inertia of the distributor bars. The anchorage point of the spring $K^5$, as may be observed (Figs. 4 and 5), is located directly above the pivotal axis of the lever K, so that it will tend to rock the said lever from either of its normal positions and, therefore, function in the manner desired whenever the hand lever G is operated (compare Figs. 6 and 9).

In order that the operator may be advised as to which distributor bar and magazine entrance are in use, there are employed two distinguishing marks visible from the front of the machine and alternately exposed to indicate the selection made. One of said marks (see Fig. 5) is placed on the front end of the slide rod J and the other on a vertical flap or gate W, the latter being hinged at its upper edge to the front face of the guideways $J^2$. The gate W is disposed directly in the path of the rod J and is swung outwardly and upwardly thereby when the rod is moved forwardly. On the other hand, when the rod is moved rearwardly, the flap is allowed to drop so as to conceal the mark on the end of the rod and at the same time expose its own marking. The mark on the rod J is, therefore, made to indicate the regular magazine entrance and distributor bar B, $B^1$, since the rod J occupies its forward position when they are in use; and the mark on the gate W is made to indicate the special magazine entrance and distributor bar C, $C^1$.

To avoid possible displacement of the respective distributor bars $B^1$, $C^1$, due to the constant vibration of the machine or to other causes, each bar is automatically locked and firmly supported as it is moved into operative position between the conveying screws H. The means employed for this purpose include a stop pin $J^6$, which projects at the right (Fig. 5) from the fixed bracket $J^3$, and angular bracket plates $B^5$, $C^5$, which are secured to the distributor bars $B^1$, $C^1$ and alined with said stop pin. The bracket plates $B^5$, $C^5$ (see Fig. 25) carry corresponding pairs of set screws $b^2$, $b^3$ and $c^2$, $c^3$, the set screws of the individual pairs being disposed at right angles to each other and arranged so that the screws $b^2$, $c^2$ will engage the top surface of the stop pin $J^6$, and the screws $b^3$ and $c^3$ will engage the opposite sides thereof, when the individual bars are rocked into active position. The stop pin $J^6$ is thus not only capable of locating the bars $B^1$ and $C^1$ in a truly vertical position, but serves also to prevent the bars from sagging between their widely separated end bearings.

The distributor bars $B^1$ and $C^1$ are also provided with corresponding studs $b^4$, $c^4$, projecting laterally from one of their side faces and arranged to be engaged by an irregularly shaped clamping lever I, the latter (see Fig. 26) being pivotally mounted on the cross beam of the distributor frame O, and provided with a pair of offset arms $I^1$, $I^2$. The arm $I^1$ is forked or bifurcated so as to straddle the distributor bar which happens to be in use, and the arm $I^2$ is formed with a beveled or cam surface $I^3$, which is arranged in the path of a roller $e^1$ carried by a rigid arm $E^5$ rising from the rocking frame E (Fig. 15). A spring $I^4$, anchored to the bracket $J^3$ and connected to the lever I, tends constantly to pull the arm $I^1$ thereof out of engagement with the bars and against the lower edge of the distributor beam.

When the roller $e^1$, during the upward movement of the rocking frame is brought into engagement with the cam surface $I^3$, the arm $I^1$ of the lever I will be moved to a position astride the particular bar in use. If said bar happens to be the regular 90-combination bar $B^1$ (as shown in Fig. 26), the rear leg of the said bifurcation is adapted to engage the stud $b^4$ and thus lock the bar against the stop pin $J^6$. On the other hand, if the special 72 combination bar $C^1$ happens to be the one selected, the front leg of the bifurcation is adapted to engage the stud $c^4$ with like results.

In this connection, it may be explained that the interchange of the distributor bars takes place before the rocking frame E is arrested in its upward movement by the stop $O^2$, and hence sufficient time is allowed for the subsequent operation of the lever I by the roller $e^1$, as above described. Also, and conversely, since the distributor bars are left undisturbed during the complete downward movement of the rocking frame E, the spring $I^4$ will be allowed to raise the lever arm $I^1$ as the roller $e^1$ is carried out of engagement with the cam surface $I^3$ so as to release the distributor bars before their interchanging movement begins.

In machines where the magazines are raised and lowered by elevating mechanisms, it is customary to employ the well-known locking bar L (see Fig. 2), which locates the individual magazines vertically and which is movable at will to and from its active position in order to permit the interchange of the magazines. The bar L is operated by an angular lever $L^1$ mounted in the framework and provided with a handle $L^2$ arranged conveniently at the front of the machine. It is also customary to employ a device for detecting the presence of matrices on the distributor bar. This latter device (best shown in Figs. 23 and 24) includes a horizontally disposed feeler blade M, which extends throughout the length of the distributor bar and is movable back and forth across the path traversed by the matrices while hanging therefrom. The feeler M (see Fig. 1) is suspended by two or more arms $M^1$ from the distributor frame and is controlled as usual from the locking bar L through the medium of an upright lever $M^2$, the latter being pivoted to the fixed bracket $O^1$ with its upper end opposed to the feeler and its lower end opposed to a stud $l$ projecting from the bar L. A spring $M^3$, attached to the feeler, tends to pull it forwardly out of the path of the matrices and holds the lever $M^2$ resiliently against a stop pin $m$.

The operation of these parts is so well understood that it will suffice to say, that they are adapted to prevent movement of the locking bar L, preparatory to the shifting of the magazines for interchange, while matrices are in the course of distribution. It is also important in the present machine that the rocking of the frame E and the consequent reversal of the distributor bars and magazine entrances be prevented under similar circumstances; otherwise, matrices may be present on the active distributor bar $B^1$ or $C^1$ when the control slide rod J is actuated and will thus become wedged into the screws with possible damage to their tooth combinations and the corresponding ribs of the distributor bar.

To guard against such contingencies, the link $G^1$, which connects the hand lever G to the rocking frame, is provided with a device for actuating the feeler independently of the bar L. The said device (see Figs. 12, 13 and 14) comprises a rectangular base plate N secured to the inner face of the link $G^1$ and formed with a cylindrical hub-like member $N^1$ which is arranged in juxtaposition to a beveled or cam surface $m^1$ at the lower end of the lever $M^2$. The member $N^1$ is provided with a spring plunger $N^2$ and also with a dog or interponent $N^3$ pivotally mounted on a vertical axis $n$. The head $n^1$ of the plunger $N^2$ is normally flush with the outer surface of the member $N^1$ and arranged in close engaging relation to the bottom edge of the lever $M^2$. The interponent $N^3$ (see Fig. 13) is formed with a nose portion $n^2$ located directly below the head $n^1$ of the plunger and likewise flush with the outer surface of the member $N^1$. The interponent $N^3$ is also formed with a handle $N^4$, which extends conveniently beyond the member $N^1$ and by which the interponent may be rocked about its axis $n$ against the tension of a spring $N^5$ to withdraw the nose portion $n^2$ from its position beneath the plunger. The spring $N^5$ is seated in the member $N^1$ and holds the interponent resiliently against a stop pin $n^3$.

Under normal conditions (with no matrices on the distributor bar), the feeler M will be actuated by the hub member $N^1$ (Fig. 24) as the latter, by the initial upward movement of the hand lever G, is brought into engagement with the cam surface $m^1$ of the lever $M^2$, the lower end of the lever $M^2$ at such times being adapted to ride over the head of the plunger $N^2$ whose spring is sufficiently strong to overcome the resistance offered by the spring $M^4$ of the feeler. However, if an attempt is made to raise the hand lever G while matrices are suspended from the distributor bar, the positive resistance offered by the matrices prevents rocking of the lever $M^2$ and, in consequence, the lower end thereof cams the plunger $N^2$ back within the member $N^1$ (Fig. 23). The nose portion $n^2$ of the interponent is thus uncovered and comes into direct contact with the bottom edge of the lever M², thereby stopping the upward movement of the hand lever G and the rocking of the frame E.

When a stoppage of the distributing mechanism occurs in the ordinary way from any one of the known causes and a lowering of the shift frame E from the rear of the machine is required for access to the magazines, it is merely necessary to retract the interponent N³ by means of the handle N⁴ (as shown in Figs. 11 and 14) so that the nose portion thereof may escape contact with the bottom edge of the lever M². Under these conditions, the rocking frame E is arrested during its downward movement in the intermediate position indicated by the dotted lines in Fig. 11, in order to prevent the release and subsequent rotation of the magazine entrances B, C. For this reason primarily, the frame E (as in the aforesaid Kennedy patent) is provided with a yoke member E⁶ pivotally mounted thereon and which serves also as a convenient means of support for a curved tray E⁷ arranged below the entrances and adapted to catch falling matrices.

The pivotal movement of the yoke member E⁶ (see Fig. 6) is limited in both directions by a pair of stop pins e², e³, which project inwardly from a depending side arm E⁸ of the yoke, and are arranged to engage the upper and lower edges of a rearward extension E⁹ of the frame E. A pull spring E¹⁰, anchored to the extension E⁹ and connected to the arm E⁸, tends to swing the yoke upwardly and hold it resiliently in its normal position shown in Fig. 4 and as determined by the stop pin e³. The arm E⁸ is also provided at its lower end with a stud e⁴ arranged in operative relation to the pocket O⁴ of the side bracket O¹. Ordinarily, the stud e⁴ (see Fig. 4) is adapted to pass clear of the pocket O⁴ as the frame E is swung downwardly, but when the yoke is depressed (see Fig. 11) against the tension of the spring E¹⁰ and the stop pin e² banks against the upper edge of the extension E⁹ (which operation is merely incidental to the lowering of the frame E), the stud e⁴ is moved into a position where it will engage the pocket O⁴ and thus stop the descent of said frame at the desired level. To insure the engagement of the stud e⁴ with the pocket O⁴, the arm E⁸ is provided with a second stud e⁵ located at a considerable distance above the stud e⁴ and arranged to engage a curved track plate E¹¹, the latter being fastened to the bracket O¹ and adapted to hold the yoke E⁶ depressed during the downward movement of the rocking frame.

Attention is now directed to Figs. 27 to 35, inclusive, which illustrate the keyboard and assembling mechanisms. The main magazines A¹, A², A³, as well as the auxiliary magazines A⁴, are each provided with escapements $a$ (shown only in connection with the main magazines) which control the release of the matrices therefrom and which are adapted to be actuated, when the selected magazines are in operative position, by two series of pivoted levers P¹, P², the levers P¹ being arranged to cooperate with the escapements of the main magazines, and the levers P² being arranged to cooperate with the escapements of the auxiliary magazines. The levers of both series are alined horizontally and are operated from a single keyboard P³. Furthermore, due to the difference in the number and spacing of the channels in the magazine A¹, which is devoted to the special 72-character display fonts, and the magazines A² or A³, which are devoted to the regular 90-character text fonts, different series of connections are established at will through which the finger keys of the keyboard may act. These connections (see Figs. 27 and 35) include two sets of vertically disposed reeds P⁴, P⁵, arranged one behind the other and having their lower ends terminating above the keyboard P³.

The reeds P⁵ (91 in number) of the rear set are substantially straight and have their upper ends arranged to engage all the escapement actuating levers P¹; whereas the reeds P⁴ (73 in number) of the front set, while having their lower end portions alined with corresponding reeds of the rear set, are offset in different directions and to different extents to locate their upper end portions in engaging relation to selected levers P¹. The reeds P⁴, P⁵ are operated by a series of fore-and-aft levers P⁶ controlled from the finger keys of the keyboard through the power operated cam yokes Y and a single series of short reed sections or rods Y¹.

The levers P⁶ are pivotally mounted and guided at their rear ends in an adjustable bar P⁷, and are formed near their front ends with upward projections $p$. The bar P⁷ is mounted in a fixed horizontal supporting frame P⁸ and is slidable forwardly and backwardly therein to locate the projections $p$ of the levers P⁶ in operative relation to the front and rear sets of reeds P⁴, P⁵, respectively. The bar P⁷ is operated from a rock shaft P¹⁰ mounted in the supporting frame P⁸ and provided with a pair of depending arms P¹¹ which are connected to the bar through horizontal links P¹².

In the present instance, the operation of the bar P⁷ is controlled by the vertical movements of the magazine shift frame A⁶ through the medium of a long vertical link P⁹ pivoted at its upper end to a lug A¹³ projecting from the lowermost member of the frame A⁶, see Fig. 27. At its lower end, the link P⁹ is formed with an elongated slot $p^1$ which engages a cross pin $p^2$ mounted in a crank arm P¹³ extending rearwardly from the rock shaft P¹⁰. For reasons presently to appear, the arm P¹³, although loosely mounted on the shaft P¹⁰, is located in a definite angular position thereon by means of an integral lug $p^3$ and a pin $p^4$ mounted transversely in said shaft. A torsion spring P²⁰, coiled around the shaft P¹⁰ and fastened thereto by a nut $p^5$ maintains the lug $p^3$ normally engaged with the pin $p^4$. The arrangement is such that, when the arm P¹³ is pushed downwardly, the shaft P¹⁰ will be turned positively in a clockwise direction and, when it is raised, the shaft will be turned yieldingly through the spring P²⁰ in the opposite direction.

The downward movement of the arm P¹³ (Fig. 27) is effected by a small block $p^6$ adjustably mounted in the slot $p^1$ of the link P⁹ and located therein at a predetermined point above the cross pin $p^2$; whereas, the upward movement of the arm P¹³ is effected by a long vertical pull spring P¹⁴ having its lower end connected to the arm and its upper end anchored to the link P⁹. Consequently, when the shift frame A⁶ is lowered to bring the special main magazine A¹ into the operative position, the link P⁹ through the block $p^6$ is adapted to depress the arm P¹³ and thereby move the bar P⁷ forwardly to locate the levers P⁶ into operative relation to the front set of reeds P⁴; and, when the shift frame is raised to bring one or the other of the regular main magazines A² or A³ into use, the spring P¹⁴ is adapted to swing the arm P¹³ upwardly (as permitted by the block $p^6$ and link P⁹) and thereby move the bar P⁷ rearwardly so as to locate the levers $P^6$ in operative relation to the rear set of reeds $P^5$. The forward position of the bar $P^7$ is determined by the block $p^6$ and the rearward position thereof is determined by stop screws $p^7$ (Fig. 27) mounted in the frame $P^8$ and against which the bar abuts.

Figure 21:
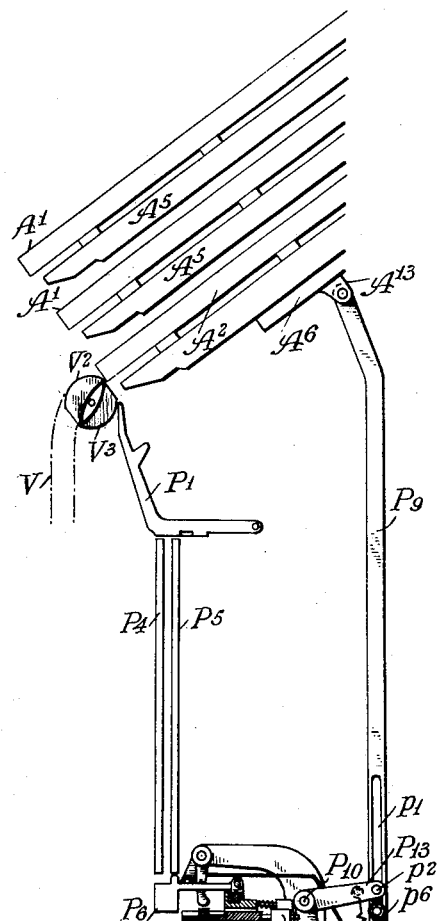
Fig. 21 is a side view, on a small scale and partly in section, illustrating diagrammatically a reversal of the spring tension on the adjusting bar of the keyboard as required when two display magazines are employed instead of one.
Figure 20:
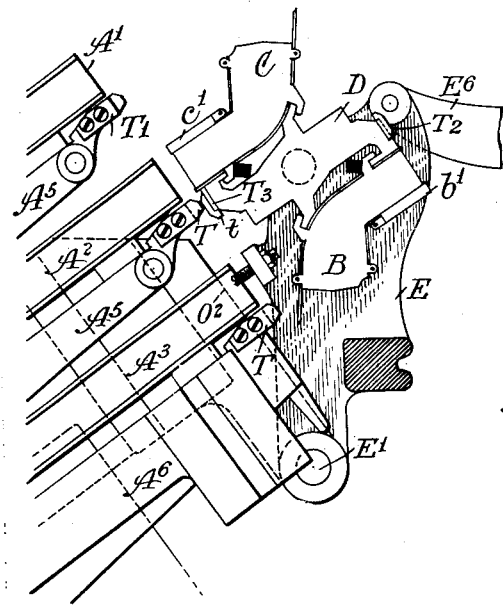
Fig. 20 is a view similar to Fig. 19, but showing the manner in which said cam plates function when the magazine and magazine entrance do not correspond.
Figure 22:
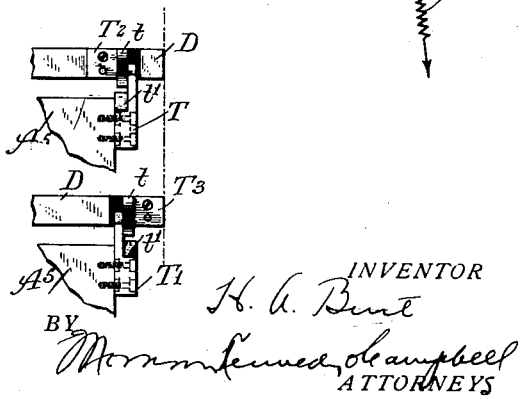
Fig. 22 is a diagrammatic view showing the relative positions of the small cam plates carried by the magazines and entrances.
Figure 31:
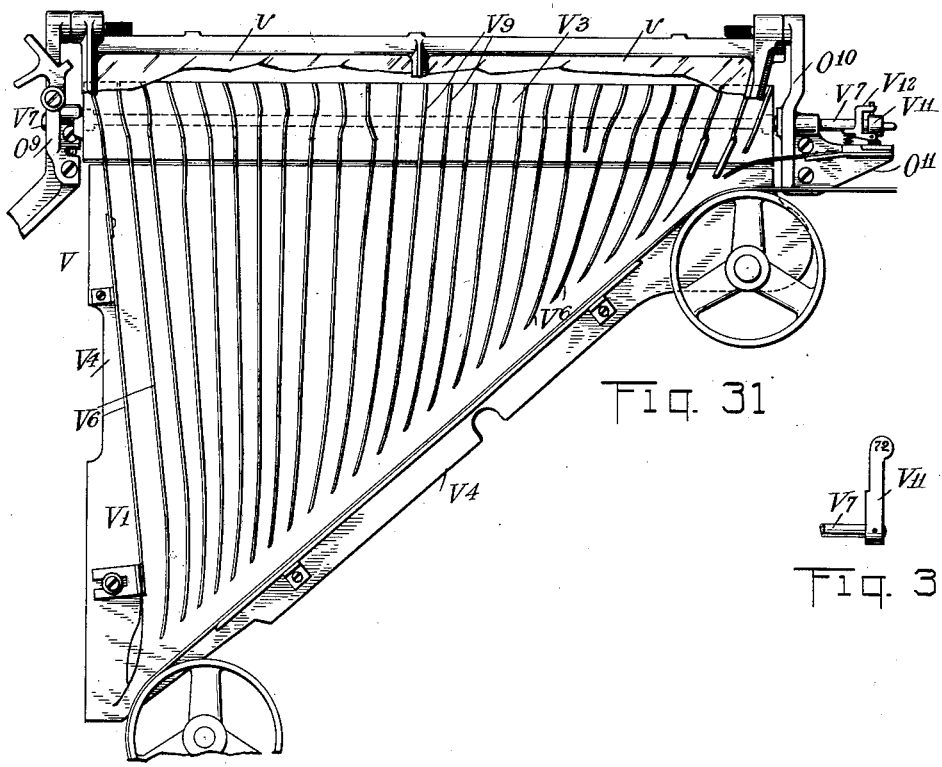
Figs. 31 and 33 are front elevations of the assembler entrance complete showing the relation between the guide plates of the reversible individual throat sections and those of the fixed vertical section.
Figure 32:
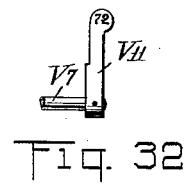
Figs. 32 and 34 are detail top and bottom plan views, respectively, of the small crank arm for interchanging the assembler throat sections.
Figure 33:
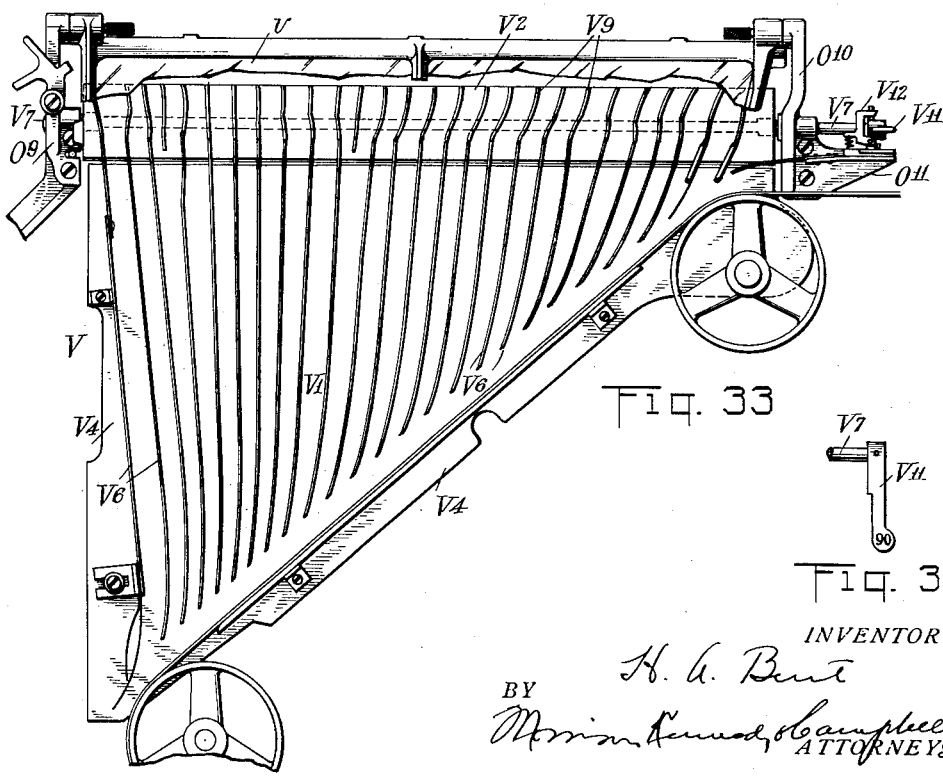
Figure 34:
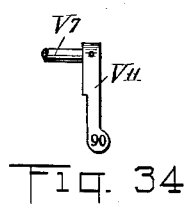

While the choice of magazines carried in the shift frame $A^6$ is thus limited to the specific arrangement shown (say, in Fig. 27), it will be noted, see Fig. 21, that two special magazines $A^1$ may be employed if desired by merely reversing the direction of the spring tension on the crank arm $P^{13}$ and shifting the block $p^6$ in the slot $p^1$ to a predetermined position below the cross pin $p^2$. In such case, the spring $P^{14}$ will maintain the bar $P^7$ in its forward position against stop screws (not shown) while either of the two special magazines $A^1$ is in use, and the long link $P^9$ will act to raise the arm $P^{13}$ and thus shift the said bar rearwardly when the lowermost regular magazine $A^2$ is brought into use. This latter operation is positive and when the bar $P^7$ banks against the stop pins $p^7$, the spring $P^{20}$ is adapted to yield in order to compensate for the slight overthrow required in the upward movement of the shift frame $A^6$ before it can be brought to rest on the locking bar L.

The mechanism for connecting the finger keys of the keyboard $P^3$ to the escapement actuating levers $P^2$ for the auxiliary magazines $A^4$ comprises, generally, a series of rocking bails $P^{15}$, an oscillatory frame $P^{16}$ connected to the upper end of the rear set of reeds $A^5$ and controlled by a finger key $P^{17}$ located conveniently adjacent the keyboard $P^3$, and an auxiliary slide member $P^{18}$ mounted in the bar $P^7$ and also controlled by the said finger key. The rocking bails $P^{15}$ bridge the distance between the escapement actuating levers $P^1$, $P^2$, and serve to connect the single series of vertical reeds $P^{19}$ for the auxiliary magazines $A^4$ with a like number of the reeds $P^5$ for the main magazines $A^2$, $A^3$. The oscillatory frame $P^{16}$ rocks the reeds $P^5$ backwardly or forwardly to make or break their connection with the bails $P^{15}$, and the auxiliary slide member $P^{18}$ is adapted, when the special magazine $A^1$ is in use and the levers $P^6$ occupy their forward position, to shift a group of said levers rearwardly into operative relation to the rear set of reeds $P^5$. A more detailed description of the above elements and the manner in which they operate is given in the Rogers patent previously referred to.

As the matrices are released from the individual main magazines for composition in line, they enter the assembler entrance V, which presents a vertical main section $V^1$ and a pair of throat sections $V^2$, $V^3$. The main section $V^1$ (see Figs. 27 to 33) is made up of a back plate $V^4$, a cover plate $V^5$, and a series of intervening partitions $V^6$, the said back and partitions being cut away at the top to accommodate the throat sections $V^2$, $V^3$. These throat sections, as in the patent to J. R. Rogers, No. 1,661,504, are inverted with relation to each other and are rotatably mounted for interchange, being secured to a rock shaft $V^7$ journalled at its opposite ends in fixed supporting brackets $O^9$, $O^{10}$, of the machine frame.

Unlike the arrangement shown in the Rogers patent, however, the axis of rotation of the throat sections $V^2$, $V^3$ (as may be noted in Fig. 27) is located rearward of the line of intersection between the central vertical plane of the main section $V^1$ and the central longitudinal plane of the magazine in use or in such position that the particular throat section in use will be uppermost and the other section lowermost. As a result of such arrangement, not only is the required visibility at the discharge end of the magazines permitted, but in addition complete access may be had to the matrices as they pass through the active throat section. An ordinary hinged transparent plate $v$, constituting an upper extension of the cover plate $V^5$, is employed to deflect the matrices downwardly as they pass through the individual throat sections $V^2$ or $V^3$, this plate being common to both throat sections and serving as the upper wall of each selected section.

Specifically, each throat section $V^2$ and $V^3$ (see Fig. 30) comprises a slightly curved base plate $V^8$ and a series of partitions $V^9$, which latter are fastened at one edge only to the base plates by means of projecting ears $v^2$ and horizontal anchor rods $v^3$. The base plates $V^8$ are held together by enlarged portions $V^{10}$ of the rock shaft $V^7$, to which they are secured (Fig. 28), and constitute conjunctively a rigid central support for the throat sections. The lower ends of the partitions $V^9$ of the respective throat sections are adapted by half rotations of the rock shaft $V^7$ in opposite directions to register with the upright partitions $V^6$ of the main section $V^1$, but the spacing of the upper ends of the partitions $V^9$ differs as between the two throat sections so as to correspond to the spacing of the channels in the regular and display magazines. That is to say, the partitions of the throat section $V^2$ are disposed at certain angles from their points of registration with the main section $V^1$, so as to cooperate with the matrix columns of the ordinary fonts contained in the regular magazines $A^2$, $A^3$; whereas, the partitions of the throat section $V^3$ are disposed at different angles from such points of registration to cooperate with the matrix columns of the display fonts contained in the special magazine $A^1$ (compare Figs. 31 and 33).

The rocking of the throat sections $V^2$, $V^3$ is manually effected by means of a small crank arm $V^{11}$, which may be swung back and forth through $180°$ to bring first one throat section and then the other into operative position. The crank arm $V^{11}$ (see Figs. 28 and 29) is fastened to one end of the rock shaft $V^7$ and its movement in both directions is limited by a pair of stop screws $v^4$ projecting above a shelf-like arm $O^{11}$ of the supporting bracket $O^{10}$. To prevent possible displacement of the individual throat sections during the operation of the machine, the crank arm $V^{11}$ is locked against movement in both of its adjusted positions by a spring latch member $V^{12}$ arranged astride the rock shaft $V^7$ and hingedly mounted on the arm $O^{11}$. The latch member $V^{12}$ (see Fig. 29) is provided with a pair of studs $v^5$ adapted in either position of the crank arm $V^{11}$ to hold it firmly against the opposed stop screws $v^4$. The free end of the crank arm $V^{11}$ is provided on its upper and lower side faces with appropriate markings to designate the different throat sections $V^2$ and $V^3$, each marking being exposed to view when the corresponding throat section by operation of the crank arm is brought into use (see Figs. 32 and 34).

According to the foregoing improvements, whenever it is desired to assemble matrices from, say, a special 72-character font stored in the top magazine $A^1$, three major operations are required; namely, an upward and then a downward movement of the hand lever G, rotation of the hand crank R in the proper direction to lower the shift frame $A^6$, and rocking the small crank arm V¹¹ over to the full line position shown in Fig. 29. These operations, however, may be performed in any other order or sequence subject to the will of the operator.

By the first operation, the feeler M is actuated; the position of the two magazine entrances B, C and that of the two distributor bars B¹, C¹ are reversed simultaneously in the manner before described; the hinged flap or gate W is allowed to drop to a vertical position so as to expose to view the mark which designates the special 72-combination bar and entrance selected; and the said distributor bar is finally locked in place against the stop pin J⁶ by the lever I. If undistributed matrices happen to be present on the distributor bar prior to the operation of the hand lever G, such operation would be prevented by the interponent N³ through the feeler M and intermediate lever M².

By the second operation, the top magazine A¹ is brought into the operative position and the slide bar P⁷ of the keyboard mechanism is moved forwardly by the long link P⁹ to carry the levers P⁶ into operative relation to the front set of reeds P⁴, thereby automatically establishing direct connections between the finger keys of the keyboard P³ and the escapements of the magazine A¹.

By the third operation, the assembled throat section V³ is brought into use and the mark on the arm V¹¹ designating that particular throat section is exposed to view.

If now it is desired to assemble matrices from one or the other of the regular 90-character fonts stored in the magazines A² and A³, the above operations are merely repeated and with like results, the hand crank R, however, being rotated in the opposite directions so as to raise the shift frame A⁶, and the arm V¹¹ being swung forwardly to the position indicated by the dotted lines, Fig. 29.

So far as the matrices stored in the auxiliary magazines are concerned, they may be selected at any time merely by first depressing the finger key P¹⁷ which connects the keyboard P³ with the escapements of the auxiliary magazine in use regardless of which of the main magazines is in use. The distribution of matrices into the auxiliary magazines is effected by whichever bar B¹ or C¹ is in operation at the time, both being alike at that portion allotted to the auxiliary magazines. If desired, the bars B¹ and C¹ could be confined to the main magazines and a single stationary section employed for the auxiliary magazines, such stationary section of course to aline with the main bar in use.

Having thus described my invention, what I claim is:

1. In a typographical distributing machine, the combination of two magazine entrances movably mounted for interchange in operative position with each other, two distributor bars also movably mounted so as to be interchangeable in operative position with each other, means operable to effect the interchange of the entrances, and means independent of said operating means for automatically effecting the interchanging movement of the distributors when the magazine entrances are interchanged.

2. In a typographical distributing machine, the combination of two magazine entrances movably mounted for interchange in operative position with each other, two distributor bars also movably mounted so as to be interchangeable in operative position with each other, means operable to effect the interchange of the entrances, and means independent of said operating means and controlled by the movement of the entrances for interchanging the distributor bars.

3. In a typographical distributing machine, the combination of two magazine entrances arranged in inverted relation to each other, a pivoted frame wherein the entrances are rotatably mounted, means for reversing the position of the entrances as the frame is rocked about its pivotal axis, two distributor bars movably mounted for interchange, and means directly associated with the respective entrances for effecting the interchange of the distributor bars as the position of the entrances is reversed.

4. In a typographical distributing machine, the combination of two differently channeled magazines, two reversible magazine entrances differing as to form to correspond to the respective magazines, a pivoted frame wherein the entrances are rotatably mounted for interchange, releasable means controlled automatically as the frame is rocked about its pivotal axis for locking the entrances against rotation in either of their reversed positions, two distributor bars movably mounted so as to be interchangeable in operative position with each other, means associated with the respective entrances for effecting the interchange of the distributor bars as the entrances are rotated, and subsidiary means operable at will to prevent unlocking of the entrances when said frame is rocked downwardly for access to the magazines.

5. In a typographical distributing machine, the combination of two differently channeled magazines, two reversible magazine entrances differing as to form to correspond to the respective magazines, a pivoted frame movable upwardly and downwardly and wherein the entrances are rotatably mounted for interchange, means for effecting a partial rotation of the entrances when the pivoted frame attains a certain level in its downward movement, a fixed abutment for arresting the said frame at a higher level, a yoke member carried by the pivoted frame and movable into and out of engaging relation to the abutment, and means to insure the engagement of said yoke member with the abutment when the pivoted frame is swung downwardly for access to the magazines.

6. In a typographical distributing machine, the combination of two differently channeled magazines, two reversible magazine entrances differing as to form to correspond to the respective magazines, a pivoted frame movable upwardly and downwardly and wherein the entrances are rotatably mounted for interchange, means for effecting a partial rotation of the entrances when the pivoted frame attains a certain level in its downward movement, a fixed abutment for arresting the said frame at a higher level, a yoke member carried by the pivoted frame and movable into and out of engaging relation to the abutment, and a fixed track arranged when the yoke member is operated to cause it to engage the fixed abutment.

7. In a typographical distributing machine, the combination of two magazine entrances mounted to rotate as a unit and arranged permanently in inverted relation to each other, two independently mounted distributor bars also movably mounted so as to be interchangeable in operative position with each other, a reciprocable slide for interchanging the distributor bars, means operable at will to reverse the position of the entrances, and means independent of said operating means and actuated by the rotation of the entrances for operating the slide.

8. A combination as specified in claim 7, including a pair of fingers associated respectively with the magazine entrances and characterized by the fact that the slide operating means therein referred to includes a pair of levers operable alternately by said fingers as the magazine entrances are rotated.

9. A combination as specified in claim 7, including a spring to facilitate the movement of the slide in both directions.

10. Typographical distributing mechanism including, in combination, a set of matrix conveying devices, two distributor bars movably mounted so that either may be brought into operative relation to said devices, and automatic means for locking the bars against displacement in their operative position.

11. Typographical distributing mechanism including, in combination, a set of matrix conveying devices, two distributor bars movably mounted so that either may be brought into operative relation to said devices, a fixed stop for locating the bars in their operative position, and means for holding the bars rigidly against said stop.

12. In a typographical distributing machine, the combination of two magazine entrances arranged in inverted relation to each other, means for reversing the position of the entrances, two distributor bars movably mounted for interchange, means associated with the respective entrances for automatically effecting the interchange of the distributor bars, and automatic means for locking the distributor bars in their operative position.

13. A combination as specified in claim 12, including a frame wherein the magazine entrances are rotatably mounted and movable to carry the entrances into operative relation to said reversing means; and characterized by the fact that the locking means consist of a forked lever movable into and out of engagement with the distributor bars and controlled by a projection on said frame.

14. In a typographical distributing machine, the combination of two differently channeled matrix magazines movably mounted for interchange in operative position with each other, two magazine entrances differing as to form to correspond to the respective magazines and also movably mounted for interchange in operative position with each other, a distributing mechanism, and automatic means for arresting the operation of the distributing mechanism when the selected magazine and the selected magazine entrance do not correspond.

15. In a typographical distributing machine, the combination of two differently channeled matrix magazines movably mounted for interchange in operative position with each other, two magazine entrances differing as to form to correspond to the respective magazines and also movably mounted for interchange in operative position with each other, distributing mechanism, automatic means for arresting the operation of the distributing mechanism when the magazine entrances are interchanged, and means for preventing the restarting of the distributing mechanism when the newly selected entrance fails to correspond to the magazine in use.

16. In a typographical distributing machine, the combination of two differently channeled matrix magazines movably mounted for interchange in operative position with each other, two magazine entrances differing as to form to correspond to the respective magazines and also movably mounted for interchange in operative position with each other, distributing mechanism, and means actuated by the interchanging movement of the magazines for arresting the operation of the distributing mechanism when the newly selected magazine fails to correspond to the magazine entrance in use.

17. In a typographical distributing machine, the combination of two differently channeled matrix magazines movably mounted for interchange in operative position with each other, two magazine entrances differing as to form to correspond to the respective magazines and also movably mounted for interchange in operative position with each other, distributing mechanism, and means to prevent the operation of the distributing mechanism unless the magazine in use corresponds to the magazine entrance in use.

18. In a typographical distributing machine, the combination of two differently channeled matrix magazines movably mounted for interchange in operative position with each other, two magazine entrances differing as to form to correspond to the respective magazines and also movably mounted for interchange in operative position with each other, a clutch for driving the distributing mechanism, and clutch control means governed in its action jointly by the particular magazine and magazine entrance in use.

19. In a typographical distributing machine, the combination of two differently channeled matrix magazines movably mounted for interchange in operative position with each other, two magazine entrances differing in form to correspond to the respective magazines, a pivoted frame wherein the magazine entrances are rotatably mounted for interchange, means operable at will for rocking the frame about its pivotal axis to effect the interchange of the magazine entrances, a clutch controlled by the rocking movement of said frame for driving the distributing mechanism, and subsidiary means for tilting the frame to effect the disengagement of the clutch when the particular magazine and entrance selected do not correspond.

20. In a typographical distributing machine, the combination of two differently channeled matrix magazines movably mounted for interchange in operative position with each other, distributing mechanism including two distributor bars differing in form to correspond to the respective magazines and also movably mounted for interchange in operative position with each other, and automatic means for arresting the operation of the distributing mechanism when the selected magazine and the selected distributor bar do not correspond.

21. In a typographical distributing machine, the combination of two differently channeled matrix magazines movably mounted for interchange in operative position with each other, distributing mechanism including two distributor bars differing in form to correspond to the respective magazines and also movably mounted for interchange in operative position with each other, and means actuated by the interchanging movement of the magazines for arresting the operation of the distributing mechanism when the newly selected magazine fails to correspond to the distributor bar in use.

22. In a typographical distributing machine, the combination of two differently channeled matrix magazines movably mounted for interchange in operative position with each other, distributing mechanism including two distributor bars differing in form to correspond to the respective magazines and also movably mounted for interchange in operative position with each other, and means to prevent the operation of the distributing mechanism unless the magazine in use corresponds to the distributor bar in use.

23. In a typographical distributing machine, the combination of two differently channeled matrix magazines movably mounted for interchange in operative position with each other, distributing mechanism including two distributor bars differing in form to correspond to the respective magazines and also movably mounted for interchange in operative position with each other, a clutch for driving the distributing mechanism, and clutch control means governed in its action jointly by the particular magazine and distributor bar in use.

24. In a typographical distributing machine, the combination of two differently channeled matrix magazines, two magazine entrances movably mounted so as to be interchangeable in operative position with each other, distributing mechanism including two distributor bars also movably mounted so as to be interchangeable in operative position with each other, means operable to effect the interchange of said entrances and bars simultaneously, a shift frame wherein the magazines are mounted, means for raising and lowering the shift frame to bring one magazine or the other into use, and safety means acting to stop the operation of the distributing mechanism when a magazine entrance and a distributor bar do not correspond to the magazine selected.

25. In a typographical distributing machine, the combination of two differently channeled matrix magazines, two magazine entrances movably mounted so as to be interchangeable in operative position with each other, distributing mechanism including two distributor bars also movably mounted so as to be interchangeable in operative position with each other, means operable to effect the interchange of said entrances and bars simultaneously, a shift frame wherein the magazines are mounted, means for raising and lowering the shift frame to bring one magazine or the other into use, automatic means for arresting the operation of the distributing mechanism when the magazine entrances and distributor bars are interchanged, and means for preventing the restarting of the distributing mechanism unless the newly selected entrance and distributor bar correspond to the magazine brought into use.

26. In a typographical distributing machine adapted to be equipped with magazines interchangeable in operative position with each other as well as with magazine entrances likewise interchangeable in operative position with each other, distributing mechanism, in combination with automatic means for arresting the operation of the distributing mechanism when the magazine in use and the magazine entrance in use do not correspond.

27. In a typographical distributing machine adapted to be equipped with magazines interchangeable in operative position with each other as well as with distributor bars likewise interchangeable in operative position with each other, means for propelling matrices along the selected bar, in combination with automatic means for arresting the operation of said matrix propelling means when the magazine in use and the distributor bar in use do not correspond.

28. In a typographical distributing machine adapted to be equipped with magazines interchangeable in operative position with each other as well as with magazine entrances likewise interchangeable in operative position with each other, a distributor clutch, in combination with clutch control means governed in its action jointly by the particular magazine and magazine entrance in use.

29. In a typographical distributing machine adapted to be equipped with magazines interchangeable in operative position with each other as well as with distributor bars likewise interchangeable in operative position with each other, a distributor clutch, and clutch control means governed in its action jointly by the particular magazine and distributor bar in use.

30. In a typographical distributing machine, the combination of two differently channeled matrix magazines movably mounted for interchange in operative position with each other, two magazine entrances differing as to form to correspond to the respective magazines and also movably mounted for interchange in operative position with each other, a clutch for driving the distributing mechanism, and cooperating distinguishing members associated respectively with the magazines and corresponding entrances, said members being arranged so as to prevent the engagement of the clutch or to effect the disengagement thereof when the particular magazine and entrance do not correspond.

31. In a typographical distributing machine, the combination of two superposed differently channeled matrix magazines, means for raising and lowering the magazines to effect their interchange in operative positon with each other, two magazine entrances rotatably mounted for interchange and differing in form to correspond to the respective magazines, a yielding plate section hingedly mounted on each of said entrances to prevent damage to matrices during the interchange of the magazines, and means for holding the plate sections against movement during rotation of the entrances.

32. Typographical distributing mechanism including, in combination, two magazine entrances rotatably mounted for interchange, means operable at will to bring one entrance or the other into the operative position, a yielding plate section hingedly mounted on each of said entrances, latches for holding the plate sections against movement during rotation of the entrances, and means arranged to cooperate with the latches for releasing the plate sections automatically as the entrances are brought into operative position.

33. In a typographical distributing machine adapted to be equipped with two differently channeled magazine entrances movably mounted so as to be interchangeable in operative position with each other, the combination of a distributor bar, means for detecting the presence of matrices on the bar, and means for preventing the interchanging movement of the magazine entrances while matrices are present on the bar.

34. In a typographical distributing machine adapted to be equipped with interchangeable distributor bars, the combination of means for detecting the presence of matrices on the bar in use, and means for preventing the interchange of the bars while matrices are present on the bar in use.

35. Typographical distributing mechanism including, in combination, a distributor bar, two differently channeled magazine entrances movably mounted so as to be interchangeable in operative position with each other, a feeler operable to detect the presence of matrices on said bar, and safety means for preventing the interchanging movement of the magazine entrances prior to the operation of the feeler.

36. Typographical distributing mechanism including, in combination, a distributor bar, two differently channeled magazine entrances movably mounted so as to be interchangeable in operative position with each other, a device operable to detect the presence of matrices on said bar, and means arranged to cooperate with the detecting device to prevent interchanging movement of the magazine entrances while matrices are on said bar.

37. A combination as specified in claim 36, characterized by the fact that the distributing mechanism includes two distributor bars movably mounted so as to be interchangeable in operative position with each other and means associated with the respective entrances for effecting the interchange of the distributor bars as the entrances are interchanged.

38. In a typographical distributing machine, the combination of two distributor bars of different form and movably mounted so as to be interchangeable in operative position with each other, a hand lever operable to effect the interchange of the bars, and automatic means to prevent the operation of the hand lever while matrices are in course of distribution.

39. In a typographical distributing machine, the combination of a distributor bar, two differently channeled magazine entrances movably mounted so as to be interchangeable in operative position with each other, a hand lever operable to effect the interchange of the magazine entrances, and automatic means to prevent the operation of the hand lever while matrices are in course of distribution.

40. In a typographical distributing machine, the combination of two magazine entrances arranged in inverted relation to each other, means for reversing the position of the entrances, two distributor bars movably mounted for interchange, means associated with the respective entrances for automatically effecting the interchange of the distributor bars, a feeler operable to detect the presence of matrices on the distributor bar in use, and means governed by said feeler to prevent the interchange of the magazine entrances and distributor bars while matrices are in course of distribution.

41. In a typographical distributing machine, the combination of two differently channeled magazines, two reversible magazine entrances differing as to form to correspond to the respective magazines, a pivoted frame wherein the entrances are rotatably mounted for interchange, releasable means controlled automatically as the frame is rocked about its pivotal axis for locking the entrances against rotation in either of their reversed positions, two distributor bars movably mounted so as to be interchangeable in operative position with each other, means associated with the respective entrances for effecting the interchange of the distributor bars as the entrances are rotated, a feeler operable to detect the presence of matrices on the distributor bar in use, and means governed by said feeler to prevent the rocking of the pivoted frame while matrices are in course of distribution.

42. In a typographical composing machine, the combination of two superposed channeled magazines provided with escapements and containing matrices occupying differently located channels according to character, a shift frame wherein the magazines are located and movable to bring either magazine into operative position, means for operating said shift frame, a single set of escapement actuating members, a corresponding set of key-controlled levers for operating said members, two sets of intermediate reeds for transmitting motion from the levers to the actuating members, and means connected to the magazine shift frame independently of its operating means and actuated directly from said frame for connecting said levers to the appropriate set of reeds.

43. In a typographical composing machine, the combination of two superposed channeled magazines provided with escapements and containing matrices occupying differently located channels according to character, a shift frame wherein the magazines are mounted and movable to bring either magazine into the operative position, means for operating said shift frame, a single set of escapement actuating members, a corresponding set of key-controlled levers for operating said members, two sets of intermediate reeds for transmitting motion from the levers to the actuating members, an adjustable bar wherein the key-controlled levers are pivotally mounted, a spring for holding the bar resiliently in one position to locate the levers in operative relation to one set of reeds, and means connected to the magazine shift frame independently of its operating means and acting in opposition to the spring for adjusting the bar to a different position to locate the levers in operative relation to the other set of reeds.

44. A combination as specified in claim 43, characterized by the fact that the adjusting means therein referred to consists of a rod depending from the magazine shift frame and connected at its lower end through intermediate linkage to the said adjustable bar.

45. In or for a typographical composing machine, an assembler entrance comprising a main section and two inverted throat sections rotatably mounted for interchange, said throat sections being made up of a pair of base plates arranged back to back, and two series of partitions, the partitions of one series being secured at one edge only to one of said plates, and the partitions of the other series being similarly secured to the other plate.

46. In a typographical composing machine adapted to be equipped with interchangeable inclined magazines, one containing a set of matrices occupying certain channels according to character and the other containing a set of matrices occupying differently located channels according to character, an assembler entrance comprising a vertically disposed main section and two inverted throat sections differing in form to correspond to the respective magazines and rotatably mounted so that either may be brought into operative relation to the main section and to the magazine in use, the axis of rotation of said throat section being located rearward of the line of intersection of the plane of the active magazine with the plane of the said main section.

47. In a typographical composing machine adapted to be equipped with interchangeable inclined magazines, one containing a set of matrices occupying certain channels according to character and the other containing a set of matrices occupying differently located channels according to character, an assembler entrance comprising a vertically disposed main section and two inverted throat sections differing in form to correspond to the respective magazines and rotatably mounted so that either may be brought into operative relation to the main section and to the magazine in use, the axis of rotation of said throat sections being so located that either section when in use will be uppermost and the other section lowermost, thereby affording free access and complete visibility to either active throat section.

48. In a typographical composing machine adapted to be equipped with interchangeable inclined magazines, one containing a set of matrices occupying certain channels according to character and the other containing a set of matrices occupying differently located channels according to character, an assembler entrance comprising a vertically disposed main section and two inverted throat sections differing in form to correspond to the respective magazines and rotatably mounted for interchange, means operable at will for rocking either throat section into operative relation to the main section and to the active magazine, and a latch for locking the throat sections against rotation in the operative position.

49. A combination as specified in claim 48, including means visible to the operator for designating the particular throat section in use.

50. In or for a typographical composing machine, an assembler entrance comprising a vertically disposed main section made up of a back plate, a cover plate and a series of intermediate upright partitions, and two partitioned throat sections rotatably mounted for interchange, the said back plate and partitions of the main section being cut away at the top to accommodate the throat sections, and the cover plate thereof being provided with an upper transparent extension common to both throat sections and serving to deflect the matrices downwardly as they pass through the throat section in use.

51. In or for a typographical composing machine, an assembler entrance comprising a main section and two inverted throat sections rotatably mounted for interchange, said throat sections being made up of a pair of base plates arranged back to back, two series of partitions, the partitions of one series being secured at one edge only to one of said plates, and the partitions of the other series being similarly secured to the other plate, and an independently mounted cover plate common to both of the throat sections and serving as the upper wall of each selected section.

52. In a typographical composing and distributing machine, the combination of two superposed channeled magazines provided with escapements and containing matrices occupying differently located channels according to character, two magazine entrances movably mounted for interchange in operative position with each other, two distributor bars also movably mounted so as to be interchangeable in operative position with each other, means operable to effect the interchange of the entrances, means controlled by the movement of the entrances for interchanging the distributor bars, a shift frame wherein the magazines are mounted and movable to bring either magazine into operative position for cooperation with the selected magazine entrance and distributor bar, means controlled by the movement of the shift frame to arrest the operation of the distributing mechanism when the magazine selected fails to correspond to the magazine entrance and distributor bar in use, a single set of escapement actuating members, a corresponding set of key-controlled levers for operating said members, two sets of intermediate reeds for transmitting motion from the levers to the actuating members, and means controlled by the movement of the magazine shift frame for connecting said levers to the appropriate set of reeds.

53. A machine according to claim 52, including as a further element an assembler entrance comprising a vertically disposed main partitioned section and two partitioned throat sections rotatably mounted so that either section may be brought into registration with the main section and the magazine in use, and manually controlled means for effecting the interchanging movement of the throat sections.

HAROLD A. BURT.